US010491323B2

(12) United States Patent
Gao

(10) Patent No.: US 10,491,323 B2
(45) Date of Patent: Nov. 26, 2019

(54) DATA TRANSMISSION CONTROL METHOD, PASSIVE OPTICAL NETWORK EQUIPMENT, APPARATUS, AND PASSIVE OPTICAL NETWORK

(71) Applicant: Huawei Technologies Co., Ltd., Shenzhen (CN)

(72) Inventor: Bo Gao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/392,111

(22) Filed: Dec. 28, 2016

(65) Prior Publication Data

US 2017/0111137 A1 Apr. 20, 2017

Related U.S. Application Data

(63) Continuation of application No. PCT/CN2014/081353, filed on Jul. 1, 2014.

(51) Int. Cl.
*H04J 14/02* (2006.01)
*H04B 10/25* (2013.01)
(Continued)

(52) U.S. Cl.
CPC ............ *H04J 14/023* (2013.01); *H04B 10/25* (2013.01); *H04B 10/27* (2013.01); *H04Q 11/0067* (2013.01); *Y02D 50/10* (2018.01)

(58) Field of Classification Search
CPC ....... H04J 14/023; H04B 10/27; H04B 10/25; Y02D 50/10; H04Q 11/0067
See application file for complete search history.

(56) References Cited

U.S. PATENT DOCUMENTS 7,385,995 B2 6/2008 Stiscia et al.
8,634,431 B1 1/2014 Chiang et al.
(Continued)

FOREIGN PATENT DOCUMENTS

CN 1614944 A 5/2005
CN 101272331 A 9/2008
(Continued)

OTHER PUBLICATIONS

Machine Translation and Abstract of Chinese Publication No. CN101272331, Sep. 24, 2008, 8 pages.
(Continued)

*Primary Examiner* — Leslie C Pascal
(74) *Attorney, Agent, or Firm* — Conley Rose, P.C.

(57) ABSTRACT

A data transmission control method, passive optical network (PON) equipment and apparatus, and a PON are presented. The method includes obtaining, by first PON equipment, data transmission information between the first PON equipment and second PON equipment; determining a target line rate between the first PON equipment and the second PON equipment according to the data transmission information; and transmitting data on a line between the first PON equipment and the second PON equipment according to the target line rate. The equipment includes an obtaining unit, a determining unit, and a communications unit. In the embodiments of the present disclosure, energy consumption of an optical network unit (ONU) can be reduced when service traffic of the ONU is light.

19 Claims, 7 Drawing Sheets

(51) Int. Cl.
*H04B 10/27* (2013.01)
*H04Q 11/00* (2006.01)

(56) References Cited

U.S. PATENT DOCUMENTS

| | | | | |
|---|---|---|---|---|
| 2004/0141759 | A1 | 7/2004 | Stiscia et al. | |
| 2004/0215809 | A1* | 10/2004 | Kim | H04W 28/22 709/232 |
| 2005/0019033 | A1 | 1/2005 | Oh et al. | |
| 2009/0097442 | A1* | 4/2009 | Diab | H04L 12/40136 370/329 |
| 2009/0154593 | A1* | 6/2009 | Diab | H04L 47/10 375/295 |
| 2012/0008937 | A1* | 1/2012 | Cheng | H04B 10/671 398/1 |
| 2012/0093509 | A1* | 4/2012 | Kazawa | H04B 10/272 398/58 |
| 2012/0177361 | A1 | 7/2012 | Hirano et al. | |
| 2013/0094861 | A1* | 4/2013 | Luo | H04J 14/0278 398/68 |
| 2014/0079396 | A1 | 3/2014 | Hirano et al. | |
| 2015/0365192 | A1* | 12/2015 | Kim | H04J 14/0256 398/66 |

FOREIGN PATENT DOCUMENTS

| | | |
|---|---|---|
| CN | 101296184 A | 10/2008 |
| CN | 101984594 A | 3/2011 |
| CN | 102379106 A | 3/2012 |
| EP | 1701468 A1 | 9/2006 |
| EP | 2624589 A2 | 8/2013 |

OTHER PUBLICATIONS

Machine Translation and Abstract of Chinese Publication No. CN101296184, Oct. 29, 2008, 16 pages.
Machine Translation and Abstract of Chinese Publication No. CN101984594, Mar. 9, 2011, 8 pages.
"Series G: Transmission Systems and Media, Digital Systems and Networks, Digital sections and digital line system—Optical line systems for local and access networks, Phoneline networking transceivers—Payload format and link layer requirements," ITU-T,G. 989.2, Nov. 2001, 66 pages.
"Series G: Transmission Systems and Media, Digital Systems and Networks, Digital sections and digital line system—Optical line systems for local and access networks, 40-Gigabit-capable passive optical networks 2 (NG-PON2): Physical media dependent (PMD) layer specification," ITU-T, G.989.2, Dec. 2014, 110 pages.
"Series G: Transmission Systems and Media,igital Systems and Networks, Digital Sections and digital line systems—Optical line systems for local and access networks, 40-Gigabit-capable passive optical networks (NG-PON2): Transmission convergence layer specification," ITU-T, G.989.3, Oct. 2015, 250 pages.
Foreign Communication From a Counterpart Application, European Application No. 14896724.3, Extended European Search Report dated May 19, 2017, 9 pages.
Foreign Communication From a Counterpart Application, PCT Application No. PCT/CN2014/081353, English Translation of International Search Report dated Apr. 13, 2015, 2 pages.
Foreign Communication From a Counterpart Application, PCT Application No. PCT/CN2014/081353, English Translation of Written Opinion dated Apr. 13, 2015, 9 pages.
Machine Translation and Abstract of Chinese Publication No. CN1614944, May 11, 2005, 15 pages.
Foreign Communication From a Counterpart Application, Chinese Application No. 201480028935.9, Chinese Office Action dated Aug. 2, 2018, 8 pages.
Gao, B., "Draft of G .989 .3 Annex H—PtP WDM Transmission Convergence Layer" XP044077283, ITU-T Draft; Study Period 2013-2016 ,Geneua;CH, vol. 2/15, Sep. 7, 2014, pp. 1-27.
Foreign Communication From a Counterpart Application, European Application No. 18190219.8, Extended European Search Report dated Mar. 22, 2019, 11 pages.

* cited by examiner

DATA TRANSMISSION CONTROL METHOD, PASSIVE OPTICAL NETWORK EQUIPMENT, APPARATUS, AND PASSIVE OPTICAL NETWORK

CROSS REFERENCE TO RELATED APPLICATIONS

This application is a continuation of International Patent Application No. PCT/CN2014/081353, filed on Jul. 1, 2014, the disclosure of which is hereby incorporated by reference in its entirety.

TECHNICAL FIELD

The present disclosure relates to the field of network communications, and in particular, to a data transmission control method, passive optical network equipment, an apparatus, and a passive optical network.

BACKGROUND

A point to point wavelength division multiplexing passive optical network (PtP WDM-PON) is a next generation passive optical network that follows a time division multiplexing passive optical network (TDM-PON) and that attracts prevalent attention in the industry, can provide a relatively large bandwidth at relatively low costs, and is an important direction for future development of optical fiber access technologies.

In an existing PtP WDM-PON system, an optical line terminal (OLT) is connected to an optical network unit (ONU) using an optical distribution network (ODN). In a process of communication between the OLT and the ONU, each ONU exclusively occupies a pair of wavelength channels (respectively used for receiving and sending), and an ONU in a wavelength channel can communicate with an OLT-side transceiver in the same wavelength channel.

In the process of communication between the OLT and the ONU, when the ONU has a few or no service requirements, the ONU keeps sending idle (idle) signals to the OLT, and consequently, energy consumption of the entire system is relatively large.

SUMMARY

To resolve a problem in the prior art that energy consumption of a system is large in a process of communication between an ONU and an OLT, embodiments of the present disclosure provide a data transmission control method and an apparatus. The technical solutions are as follows.

According to a first aspect, an embodiment of the present disclosure provides a data transmission control method, where the method includes obtaining, by first passive optical network PON equipment, data transmission information between the first PON equipment and second PON equipment, where the data transmission information includes at least one of service traffic information between the first PON equipment and the second PON equipment, transmit buffer occupancy information of the first PON equipment, or transmit buffer occupancy information of the second PON equipment; determining a target line rate between the first PON equipment and the second PON equipment according to the data transmission information; and transmitting data on a line between the first PON equipment and the second PON equipment according to the target line rate, where when the first PON equipment is an optical line terminal OLT, the second PON equipment is an optical network unit ONU; or when the first PON equipment is an ONU, the second PON equipment is an OLT.

In an implementation manner of this embodiment of the present disclosure, the service traffic information includes a quantity and a size of service packets transmitted between the first PON equipment and the second PON equipment within a specified duration; the transmit buffer occupancy information of the first PON equipment includes a transmit buffer occupancy rate of the first PON equipment or a data volume in a transmit buffer of the first PON equipment; and the transmit buffer occupancy information of the second PON equipment includes a transmit buffer occupancy rate of the second PON equipment or a data volume in a transmit buffer of the second PON equipment.

Further, the determining a target line rate between the first PON equipment and the second PON equipment according to the data transmission information includes calculating a service rate between the first PON equipment and the second PON equipment according to the data transmission information; and when the service rate is less than a current line rate between the first PON equipment and the second PON equipment, using a lowest line rate that is greater than the service rate and that is in line rates supported by the first PON equipment and the second PON equipment, as the target line rate.

Still further, the determining a target line rate between the first PON equipment and the second PON equipment according to the data transmission information further includes, when the service rate is greater than the current line rate between the first PON equipment and the second PON equipment and the transmit buffer occupancy rate of the first PON equipment reaches a specified threshold, using the lowest line rate that is greater than the service rate and that is in the line rates supported by the first PON equipment and the second PON equipment, as the target line rate.

In an implementation manner of this embodiment of the present disclosure, the method further includes, when the target line rate is different from the current line rate between the first PON equipment and the second PON equipment, sending a rate tuning request message to the second PON equipment, where the rate tuning request message includes a target line rate field, and the target line rate field carries the target line rate and is used to instruct the second PON equipment to tune the current line rate to the target line rate.

In another implementation manner of this embodiment of the present disclosure, the method may further include receiving a rate tuning response message sent by the second PON equipment, where the rate tuning response message includes an acknowledgment field, or the rate tuning response message includes an acknowledgment field and a rejection reason field, the acknowledgment field is used to indicate whether the second PON equipment accepts rate tuning, and when the acknowledgment field indicates that the second PON equipment rejects the rate tuning, the rejection reason field is used to carry a reason for rejecting, by the second PON equipment, the rate tuning.

Optionally, the rate tuning request message further includes a rate tuning start moment field or a rollback flag, where the rate tuning start moment field is used to carry a condition for starting the rate tuning, and the rollback flag is used to indicate a line rate that is used when the second PON equipment fails in the rate tuning.

According to a second aspect, an embodiment of the present disclosure provides passive optical network PON equipment, where the equipment includes an obtaining unit configured to obtain data transmission information between the PON equipment and second PON equipment, where the data transmission information includes at least one of service traffic information between the PON equipment and the second PON equipment, transmit buffer occupancy information of the PON equipment, or transmit buffer occupancy information of the second PON equipment; a determining unit configured to determine a target line rate between the PON equipment and the second PON equipment according to the data transmission information; and a communications unit configured to transmit data on a line between the PON equipment and the second PON equipment according to the target line rate determined by the processing unit, where when the PON equipment is an optical line terminal OLT, the second PON equipment is an optical network unit ONU; or when the PON equipment is an ONU, the second PON equipment is an OLT.

In an implementation manner of this embodiment of the present disclosure, the service traffic information includes a quantity and a size of service packets transmitted between the PON equipment and the second PON equipment within a specified duration; the transmit buffer occupancy information of the PON equipment includes a transmit buffer occupancy rate of the PON equipment or a data volume in a transmit buffer of the PON equipment; and the transmit buffer occupancy information of the second PON equipment includes a transmit buffer occupancy rate of the second PON equipment or a data volume in a transmit buffer of the second PON equipment.

Further, the determining unit includes a calculation subunit configured to calculate a service rate between the PON equipment and the second PON equipment according to the data transmission information; and a determining subunit configured to, when the service rate is less than a current line rate between the first PON equipment and the second PON equipment, use a lowest line rate that is greater than the service rate and that is in line rates supported by the first PON equipment and the second PON equipment, as the target line rate.

Still further, the determining subunit is further configured to, when the service rate is greater than the current line rate between the PON equipment and the second PON equipment and the transmit buffer occupancy rate of the PON equipment reaches a specified threshold, use the lowest line rate that is greater than the service rate and that is in the line rates supported by the PON equipment and the second PON equipment, as the target line rate.

In an implementation manner of this embodiment of the present disclosure, the communications unit is further configured to, when the target line rate is different from a current line rate between the PON equipment and the second PON equipment, send a rate tuning request message to the second PON equipment, where the rate tuning request message includes a target line rate field, and the target line rate field carries the target line rate and is used to instruct the second PON equipment to tune the current line rate to the target line rate.

In another implementation manner of this embodiment of the present disclosure, the communications unit is further configured to receive a rate tuning response message sent by the second PON equipment, where the rate tuning response message includes an acknowledgment field, or the rate tuning response message includes an acknowledgment field and a rejection reason field, the acknowledgment field is used to indicate whether the second PON equipment accepts rate tuning, and when the acknowledgment field indicates that the second PON equipment rejects the rate tuning, the rejection reason field is used to carry a reason for rejecting, by the second PON equipment, the rate tuning.

Optionally, the rate tuning request message further includes a rate tuning start moment field or a rollback flag, where the rate tuning start moment field is used to carry a condition for starting the rate tuning, and the rollback flag is used to indicate a line rate that is used when the second PON equipment fails in the rate tuning.

According to a third aspect, an embodiment of the present disclosure provides an apparatus applied to passive optical network PON equipment, where the apparatus includes a processor, a memory, a bus, and a communications interface, where the memory is configured to store an execution instruction of a computer, the processor is connected to the memory using the bus, and when the computer runs, the processor executes the execution instruction of the computer stored by the memory, so that the computer executes the method according to the foregoing first aspect.

According to a fourth aspect, an embodiment of the present disclosure provides passive optical network PON equipment, where the equipment includes a processor and a transceiver, where the processor includes the apparatus according to the third aspect; and the transceiver is configured to transmit data on a line between the PON equipment and second PON equipment according to a target line rate determined by the processor.

Further, the transceiver is further configured to, when the target line rate is different from a current line rate between the PON equipment and the second PON equipment, send a rate tuning request message to the second PON equipment, where the rate tuning request message includes a target line rate field, and the target line rate field carries the target line rate and is used to instruct the second PON equipment to tune the current line rate to the target line rate.

Optionally, the transceiver is further configured to receive a rate tuning response message sent by the second PON equipment, where the rate tuning response message includes an acknowledgment field, or the rate tuning response message includes an acknowledgment field and a rejection reason field, the acknowledgment field is used to indicate whether the second PON equipment accepts rate tuning, and when the acknowledgment field indicates that the second PON equipment rejects the rate tuning, the rejection reason field is used to carry a reason for rejecting, by the second PON equipment, the rate tuning.

Optionally, the rate tuning request message further includes a rate tuning start moment field or a rollback flag, where the rate tuning start moment field is used to carry a condition for starting the rate tuning, and the rollback flag is used to indicate a line rate that is used when the second PON equipment fails in the rate tuning.

According to a fifth aspect, an embodiment of the present disclosure further provides a passive optical network, including first PON equipment, second PON equipment, and an optical distribution network, where the first PON equipment is connected to the second PON equipment using the optical distribution network; and when the first PON equipment is an optical line terminal OLT, the second PON equipment is an optical network unit ONU; or when the first PON equipment is an ONU, the second PON equipment is an OLT, where the first PON equipment is the PON equipment according to the second aspect, or the first PON equipment is the PON equipment according to the fourth aspect.

Beneficial effects of the technical solutions provided in the embodiments of the present disclosure are as follows. A target line rate is determined according to data transmission information between first PON equipment and second PON equipment, and data is transmitted on a line between the first PON equipment and the second PON equipment according to the target line rate, so that a line rate may be tuned according to real-time service traffic between the first PON equipment and the second PON equipment. The line rate is decreased when the service traffic between the first PON equipment and the second PON equipment is relatively small, so that idle signals sent by an ONU can be reduced to achieve energy conservation; or the line rate is increased when the service traffic between the first PON equipment and the second PON equipment is relatively large, so that communication latency between the first PON equipment and the second PON equipment can be reduced and a packet loss can be avoided, thereby improving reliability of communication.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Embodiments of the present disclosure provide a data transmission control method and an apparatus, which are suitable for controlling a line rate of data transmission in a PtP WDM-PON system. The following first describes a network architecture of a PtP WDM-PON system with reference to FIG. 1.

Figure 1:
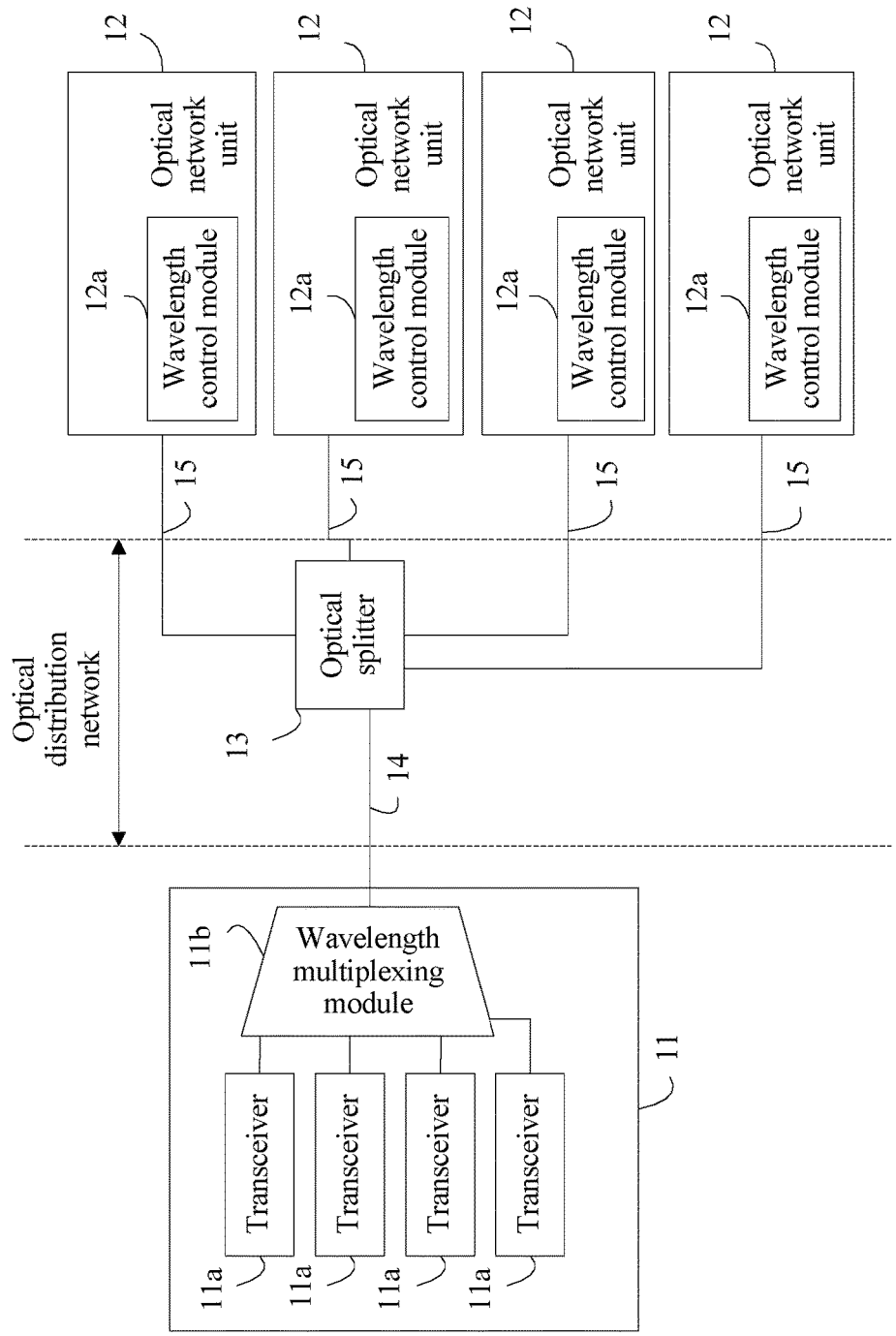
FIG. 1 is a network architecture diagram of a PtP WDM-PON system according to an embodiment of the present disclosure.

FIG. 1 shows the network architecture of the PtP WDM-PON system. Referring to FIG. 1, an OLT 11 is connected to multiple ONUs 12 using an ODN. The optical distribution network ODN includes an optical splitter 13, where the optical splitter 13 is configured to split a feeder fiber 14 into multiple branches 15, and each branch 15 is connected to one corresponding ONU 12. A direction from the OLT to the ONUs is a downstream direction, and a direction from the ONUs to the OLT is an upstream direction. In the following embodiments, "downstream" is "from an OLT to an ONU", and "upstream" is "from an ONU to an OLT". For example, "upstream data transmission information" mentioned in the embodiments is "information about data transmission from an ONU to an OLT", and the rest may be deduced by analogy.

Multiple transceivers 11a and a wavelength multiplexing module 11b connected to the multiple transceivers 11a are disposed on the OLT 11, and each transceiver 11a corresponds to a pair of wavelength channels (respectively used for receiving and sending). The transceivers 11a are configured to map data of different ONUs to particular wavelength channels, and the data passes through the multiple wavelength channels and is multiplexed by the wavelength multiplexing module 11b, thereby sharing one feeder fiber 14.

To implement a colorless ONU (that is, a wavelength of the ONU can be set or automatically adapted), a wavelength control module 12a may be configured for each ONU 12, where the wavelength control module 12a is configured to control transmit and receive wavelengths of an ONU in which the wavelength control module 12a is located. In a data transmission process, each ONU exclusively occupies a pair of wavelength channels and can support continuous receiving and sending. An ONU in a wavelength channel can communicate with an OLT-side transceiver in the same wavelength channel.

It is easy to learn that, in the foregoing scenario, no wavelength control module 12a may be alternatively configured for the ONU 12, and the PtP WDM-PON system may also be formed using multiple ONUs with different fixed wavelengths.

Embodiment 1

Figure 2:
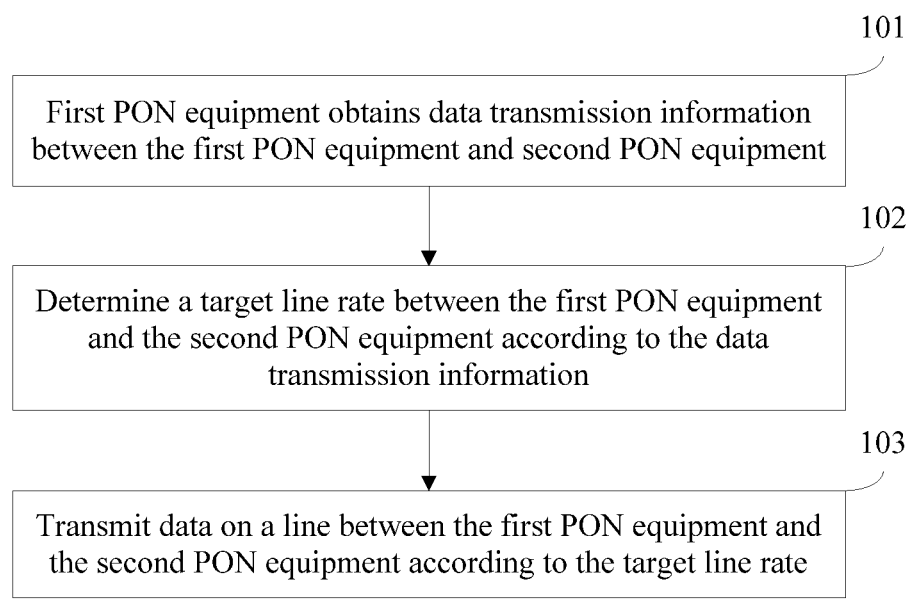
FIG. 2 is a flowchart of a data transmission control method according to Embodiment 1 of the present disclosure.

This embodiment of the present disclosure provides a data transmission method. Referring to FIG. 2, the method includes the following steps.

Step 101: First PON equipment obtains data transmission information between the first PON equipment and second PON equipment.

The data transmission information may include at least one of service traffic information between the first PON equipment and the second PON equipment, transmit buffer occupancy information of the first PON equipment, or transmit buffer occupancy information of the second PON equipment.

The service traffic information may include a quantity and a size of service packets transmitted between the first PON equipment and the second PON equipment within a specified duration; the transmit buffer occupancy information of the first PON equipment includes a transmit buffer occupancy rate of the first PON equipment or a data volume in a transmit buffer of the first PON equipment; and the transmit buffer occupancy information of the second PON equipment includes a transmit buffer occupancy rate of the second PON equipment or a data volume in a transmit buffer of the second PON equipment.

In step 101, when the first PON equipment is an OLT, the second PON equipment is an ONU; or when the first PON equipment is an ONU, the second PON equipment is an OLT.

It should be noted that, the data transmission information between the first PON equipment and the second PON equipment may include upstream data transmission information and downstream data transmission information.

Step 102: Determine a target line rate between the first PON equipment and the second PON equipment according to the data transmission information.

Correspondingly, a target upstream rate may be determined according to the upstream data transmission information between the first PON equipment and the second PON equipment (referring to Embodiment 3), and a target downstream rate may be determined according to the downstream data transmission information between the first PON equipment and the second PON equipment (referring to Embodiment 2).

Step 103: Transmit data on a line between the first PON equipment and the second PON equipment according to the target line rate.

In this embodiment of the present disclosure, a target line rate is determined according to data transmission information between first PON equipment and second PON equipment, and data is transmitted on a line between the first PON equipment and the second PON equipment according to the target line rate, so that a line rate may be tuned according to real-time service traffic between the first PON equipment and the second PON equipment. The line rate is decreased when the service traffic between the first PON equipment and the second PON equipment is relatively small, so that idle signals sent by an ONU can be reduced to achieve energy conservation; or the line rate is increased when the service traffic between the first PON equipment and the second PON equipment is relatively large, so that communication latency between the first PON equipment and the second PON equipment can be reduced and a packet loss can be avoided, thereby improving reliability of communication.

Embodiment 2

Figure 3A:
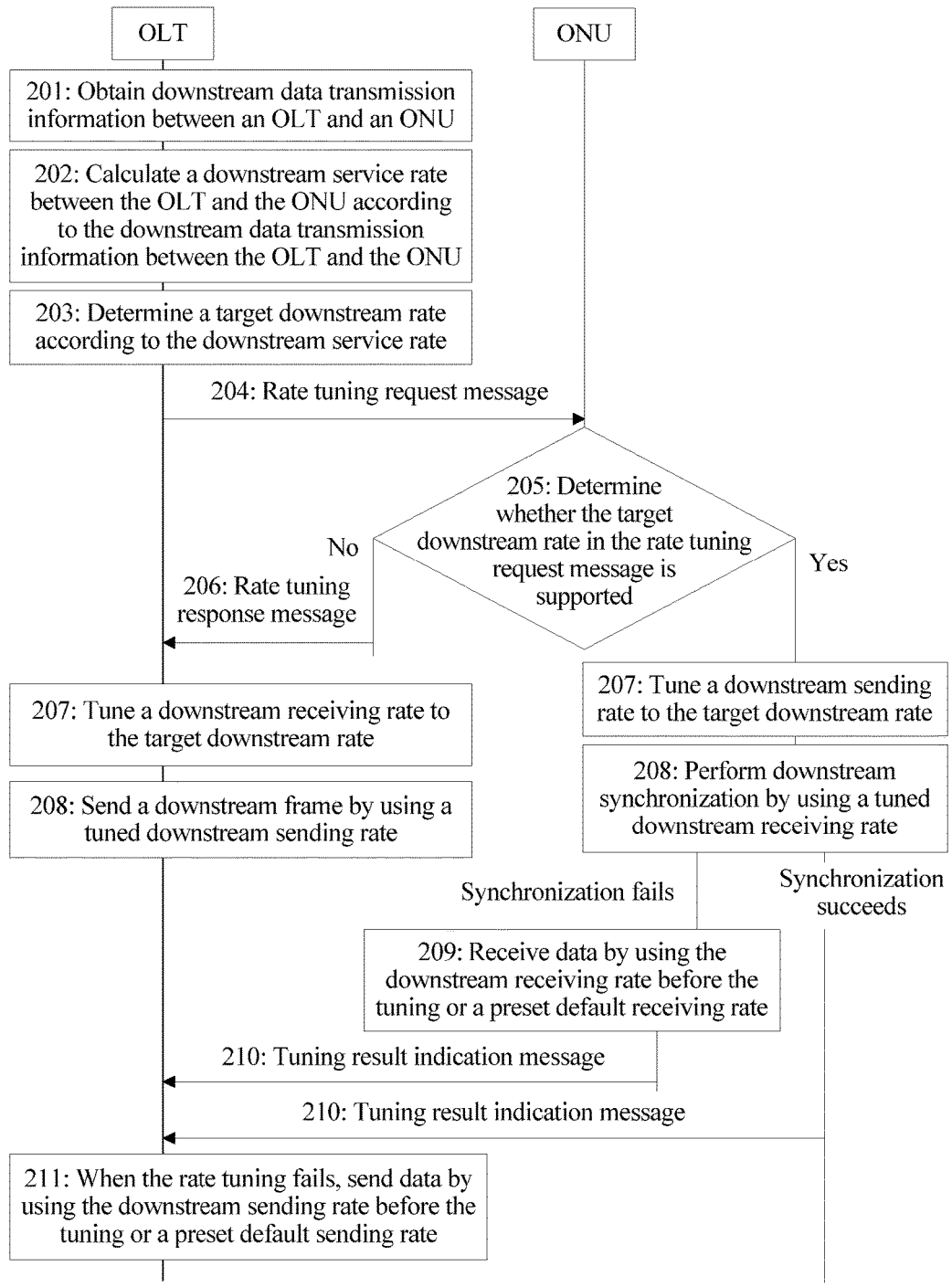
FIG. 3A is a flowchart of a data transmission control method according to Embodiment 2 of the present disclosure.

This embodiment of the present disclosure provides a data transmission method. In this embodiment, first PON equipment is an OLT, and second PON equipment is an ONU. In this embodiment, the present disclosure is described using an example of tuning a downstream line rate (that is, a downstream sending rate of the OLT and a downstream receiving rate of the ONU) between the first PON equipment and the second PON equipment according to downstream data transmission information between the first PON equipment and the second PON equipment. Referring to FIG. 3A, the method includes the following steps.

Step 201: The OLT obtains the downstream data transmission information between the OLT and the ONU.

The downstream data transmission information may include at least one of downstream service traffic information between the OLT and the ONU, or transmit buffer occupancy information of the OLT.

The downstream service traffic information may include a quantity and a size of service packets sent to the ONU by the OLT within a specified duration; and the transmit buffer occupancy information of the OLT includes a transmit buffer occupancy rate of the OLT or a data volume in a transmit buffer of the OLT. The transmit buffer occupancy rate of the OLT refers to a ratio of a current data volume in the transmit buffer of the OLT to a total capacity of the transmit buffer of the OLT.

As described above, one OLT communicates with multiple ONUs, and the ONU in step 201 may be any one of the multiple ONUs that communicate with the OLT. It may be understood that, a transmit buffer and a receive buffer are disposed for each ONU corresponding to the OLT, and a quantity of transmit buffers or receive buffers corresponding to each ONU is set according to an actual requirement. There may be one or more transmit buffers or receive buffers corresponding to each ONU, or multiple ONUs may share one transmit buffer or receive buffer. It is easy to learn that, the transmit buffer of the OLT in this embodiment refers to a transmit buffer corresponding to the ONU, and all data to be sent to the ONU is first placed in the transmit buffer corresponding to the ONU.

The specified duration may be set according to an actual situation, for example, to 2 s or 5 s.

Step 202: The OLT calculates a downstream service rate between the OLT and the ONU according to the downstream data transmission information between the OLT and the ONU.

In a first implementation manner, the downstream data transmission information is the downstream service traffic information between the OLT and the ONU (that is, a quantity and a size of downstream service packets sent to the ONU by the OLT within the specified duration). In this case, step 202 may include calculating an average rate of a downstream service according to the quantity and the size of the downstream service packets sent to the ONU by the OLT within the specified duration, where the average rate of the downstream service is the downstream service rate.

For example, it is assumed that the OLT sends ten 500-byte packets and five 1000-byte packets to the ONU within 2 seconds (s); in this case, the average rate is $(10 \times 500 \times 8 + 5 \times 1000 \times 8) \div 2 = 40000$ bytes per second (bps).

Within the specified duration, the quantity and the size of the downstream service packets may be counted using a transmit buffer queue, or may be counted during sending or receiving. This is the prior art, and detailed descriptions are omitted herein.

In a second implementation manner, the downstream data transmission information is the transmit buffer occupancy information of the OLT. In this case, step 202 may include calculating the downstream service rate according to the transmit buffer occupancy information of the OLT and a current line rate.

The downstream service rate may be calculated using the following formula: Downstream service rate=Current line rate+Coefficient×Buffer data volume or occupancy change rate. The coefficient may be set according to an actual situation. When the buffer data volume or occupancy keeps increasing with time, the coefficient is a particular positive value such as 1; otherwise, the coefficient is a particular negative value such as −1.

It may be understood that, if the transmit buffer occupancy or the buffer data volume remains unchanged, it indicates that the downstream service rate is equal to a current sending rate; if the transmit buffer occupancy or the buffer data volume keeps increasing, it indicates that the downstream service rate is greater than a current sending rate, a faster increase in the transmit buffer occupancy or the buffer data volume indicates a larger difference between the service rate and the current sending rate, and a slower increase indicates a smaller difference between the service rate and the current sending rate; or if the transmit buffer occupancy or the buffer data volume gradually decreases, it indicates that the downstream service rate is less than a current sending rate, a faster decrease indicates a larger difference between the service rate and the sending rate, and a slower decrease indicates a smaller difference between the service rate and the sending rate. That is, the change rate of the buffer occupancy or the buffer data volume determines a rate difference between the downstream service rate and the current sending rate, and a specified linear relationship exists between the change rate and the rate difference. Therefore, the downstream service rate may be calculated according to the transmit buffer occupancy information and the current sending rate by setting an appropriate coefficient.

It may be understood that, the foregoing formula is only exemplary, and in an actual application, there may be a non-linear relationship between the change rate of the buffer occupancy or the buffer data volume and the rate difference between the downstream service rate and the current sending rate. In this case, the downstream service rate may be calculated using another formula. No limitation is imposed thereto in the present disclosure.

In a third implementation manner, the downstream data transmission information includes the downstream service traffic information between the OLT and the ONU and the transmit buffer occupancy information of the OLT. In this case, step 202 may include, when the buffer data volume or occupancy is zero (0) within the specified duration, calculating the downstream service rate in the first implementation manner; or when the buffer data volume or occupancy is not zero (0), calculating the downstream service rate in the second implementation manner within the specified duration.

This embodiment of the present disclosure is not only limited to the foregoing three implementation manners. The first implementation manner and the second implementation manner may be further combined in a different way. For example, within a current duration, only the buffer occupancy information is detected, and if the buffer data volume or occupancy remains zero (0), a quantity and a size of service packets within a next specified duration are counted, where the two specified durations may be the same or different.

Step 203: The OLT determines a target downstream rate between the OLT and the ONU according to the downstream service rate between the OLT and the ONU.

In an implementation manner, step 203 may include, when the downstream service rate between the OLT and the ONU is greater than the current line rate and the transmit buffer occupancy rate of the OLT reaches a specified threshold, or when the downstream service rate between the OLT and the ONU is less than the current line rate, using a lowest line rate that is greater than the downstream service rate between the OLT and the ONU and that is in line rates supported by the OLT and the ONU, as the target downstream rate; or when the downstream service rate between the OLT and the ONU is greater than the current line rate and the transmit buffer occupancy rate of the OLT does not reach a specified threshold, using the current line rate as the target downstream rate.

The specified threshold may be set according to an actual requirement, for example, to 50%. No limitation is imposed thereto in the present disclosure. Excessively frequent rate tuning may be avoided by setting the threshold.

In another implementation manner, step 203 may include using a lowest line rate that is greater than the downstream service rate of the ONU and that is in line rates supported by the OLT and the ONU, as the target downstream rate, where a specified service burst margin may be reserved, so as to improve reliability of data communication.

It is easy to learn that, line rates supported by a current PtP WDM-GON system (that is, the line rates supported by the ONU and the OLT) include 1.24416, 1.25, 1.2288; 2.48832, 2.4576, 2.666; 9.95328, 9.8304, 10.709, 11.09; 10.3125; and 6.144.

The determining the target downstream rate between the OLT and the ONU according to the downstream data transmission information between the OLT and the ONU can be implemented by means of step 202 and step 203.

Step 204: When the target downstream rate is different from a current line rate (that is, a current downstream line rate between the OLT and the ONU), the OLT sends a rate tuning request message to the ONU.

The rate tuning request message includes a target line rate field, where the target line rate field carries a target line rate and is used to instruct the ONU to tune the current line rate to the target line rate.

In this embodiment, the target line rate field carries the target downstream rate and is used to instruct the ONU to tune the downstream receiving rate to the target downstream rate.

In step 204, the OLT compares the target downstream rate with a current downstream sending rate of the OLT, and if the target downstream rate is the same as the current downstream sending rate of the OLT, keeps sending data using the current sending rate, so as to maintain normal communication; or if the target downstream rate is different from the current downstream sending rate, sends the rate tuning request message to the ONU.

Preferably, the rate tuning request message may be sent using an auxiliary management and control channel (AMCC). The AMCC is a newly added out-of-band control channel in the PtP WDM-GON system, and can be carried in an optical carrier in which data is the same as data in a service channel using another modulation technology such as a sub-carrier modulation technology. Generally, low-power and low-frequency modulation may be used, so as to ensure that normal transmission on the service channel is not affected when a wavelength is used, and caused power consumption and power can be ignored.

It is easy to learn that, the rate tuning request message may be alternatively sent using another control channel. No limitation is imposed thereto in this embodiment of the present disclosure.

In addition, in this embodiment, the rate tuning request message may further include a rate tuning start moment field used to carry a condition for starting the rate tuning. A value of the rate tuning start moment field is preferably a value of a particular bit (bit) of a downstream superframe counter. The particular bit may be all bits or a part of bits of the downstream superframe counter. When the value of the rate tuning start moment field is set to the value of the particular bit of the downstream superframe counter, the ONU starts to tune a rate when a value of a particular bit of a superframe counter field in a received downstream frame header is the same as the value of the rate tuning start moment field.

In another embodiment, the value of the rate tuning start moment field may be alternatively a time value, and a rate starts to be tuned at a moment corresponding to the time value; or a rate may be further tuned according to an agreed condition. For example, the rate tuning request message carries a time stamp, and it is agreed that the rate is tuned at a specified moment after time indicated by the time stamp. No limitation is imposed thereto in the present disclosure.

In addition, the rate tuning request message may further include a rollback flag. The rollback flag is used to indicate a line rate that is used when the rate tuning by the ONU fails. For example, if the rollback flag is 1, it indicates that if the rate tuning fails, a rate before the tuning is restored; or if the rollback flag is 0, it indicates that if the rate tuning fails, a preset default rate is restored.

In this embodiment, the rate tuning request message may be implemented using a physical layer operations, administration and maintenance (PLOAM) message. The rate tuning request message may be implemented using a PLOAM message format in Table 1.

TABLE 1

Rate tuning request message

| Octet (Octet) | Content (Content) | Description (Description) |
|---|---|---|
| 1 and 2 | ONU-ID | Indicates a message provided to an ONU. |
| 3 | Message type ID (message type ID) | Indicates line rate tuning control (Line_rate_Tuning_Control). |
| 4 | Sequence number (SeqNo) | Indicates a unicast PLOAM sequence number. |
| 5-n | Starting counting for downstream rate tuning (Downstream start count) | Indicates a moment at which the ONU starts to tune a downstream receiving rate, where values are all values or a part of values of particular bits of a downstream superframe counter. The ONU starts to switch a rate when receiving a downstream frame header in which all values or a part of values of particular bits of a superframe counter field are the same as the value of this octet of the message. |
| n + 1-m | Starting counting for upstream rate tuning (Upstream start count) | Indicates a moment at which the ONU starts to tune an upstream sending rate, where a value is a value of a particular bit of a downstream superframe counter. The ONU starts to tune a rate when receiving a downstream frame header in which a value of a particular bit of a superframe counter field is the same as the value of this octet of the message. |
| m + 1 | 0000 000R | Indicates a rollback flag. R = 1, which indicates that rate tuning fails; in this case, a rate before the tuning is restored. R = 0, which indicates that rate tuning fails; in this case, a preset default rate is restored. |
| m + 2 | 00DD 00UU | Indicates a target downstream rate. DD = 0 indicates a code 0 corresponding to a target tuning rate 0 or a rate 0, and indicates that a downstream channel is closed. DD = 1 indicates a code 1 corresponding to a target tuning rate 1 Gbps or 1 Gbps. DD = 2 indicates a code 2 corresponding to a target tuning rate 2.5 Gbps or 2.5 Gbps. DD = 3 indicates a code 3 corresponding to a target tuning rate 10 Gbps or 10 Gbps. Indicates a target upstream rate. UU = 0 indicates a code 0 corresponding to a target tuning rate 0 or a rate 0, and indicates that an upstream channel is closed. UU = 1 indicates a code 1 corresponding to a target tuning rate 1 Gbps or 1 Gbps. UU = 2 indicates a code 2 corresponding to a target tuning rate 1 Gbps or 2.5 Gbps. UU = 3 indicates a code 3 corresponding to a target tuning rate 1 Gbps or 10 Gbps. |

TABLE 1-continued

Rate tuning request message

| Octet (Octet) | Content (Content) | Description (Description) |
|---|---|---|
| m + 3-40 | Padding (Padding) | Be filled with all 0s by a transmitter, and be ignored by a receiver. |
| 41-48 | MIC | Indicates message integrity check (Message integrity check). |

In the PLOAM message format shown in Table 1, the octet 3 is used to indicate a type of a PLOAM message, that is, to indicate that the PLOAM message is a rate tuning request message. The octets n+1–m and the octets 5–n are rate tuning start moment fields, and are respectively used to indicate a start moment of upstream rate tuning and a start moment of downstream rate tuning. The octet m+1 is the rollback flag. The octet m+2 is the target line rate field. In an implementation manner of Table 1, a high-order bit of the octet m+2 is used to indicate the target downstream rate, and a low-order bit of the octet m+2 is used to indicate the target upstream rate, which can be exchanged understandably.

It should be noted that, in this embodiment, the rate tuning request message is implemented using the PLOAM message, and in another embodiment, the rate tuning request message may be further implemented using a Multi-Point Control Protocol (MPCP) message or an operations, administration and maintenance (OAM) message encapsulated based on an Ethernet frame format. No limitation is imposed thereto in the present disclosure.

Step 205: The ONU determines whether the target downstream rate in the rate tuning request message is supported, and when the ONU does not support the target downstream rate, performs step 206; or when the ONU supports the target downstream rate, performs step 207.

Optionally, before step 205, the method may further include determining, by the ONU, whether the target downstream rate is the same as the current receiving rate, and if the target downstream rate is different from the current receiving rate, performing step 205; or if the target downstream rate is the same as the current receiving rate, continuing, by the ONU, to use the current downstream receiving rate to receive data.

Step 206: The ONU sends a rate tuning response message to the OLT, where the rate tuning response message includes an acknowledgment field, and the acknowledgment field is used to indicate whether the ONU accepts rate tuning; in step 206, the acknowledgment field is used to indicate that the ONU rejects the rate tuning.

Optionally, the rate tuning response message may further include a rejection reason field. The rejection reason field is used to carry a reason for rejecting, by the ONU, the rate tuning, for example, the ONU is busy, or the target downstream rate is not supported.

Optionally, after step 205, when the ONU supports the target downstream rate, the method may further include sending, by the ONU, a rate tuning response message to the OLT, where an acknowledgment field in the rate tuning response message is used to indicate that the ONU accepts the rate tuning.

Preferably, the rate response tuning message is also sent using the AMCC channel.

During implementation, the rate tuning response message may also be implemented using a PLOAM message. A PLOAM message format in Table 2 may be used.

TABLE 2

| Octet | Content | Description |
|---|---|---|
| 1 and 2 | ONU-ID | Indicates a unicast message from an ONU. |
| 3 | Message type ID (message type ID) | Indicates a line rate tuning response (Line_rate_Tuning_Response). |
| 4 | Sequence number (SeqNo) | Indicates a unicast PLOAM sequence number. |
| 5 | Operation Code (Operation Code) | 0 - ACK (ACK): The ONU accepts a rate tuning request.<br>1 - NACK (NACK): The ONU rejects a rate tuning request.<br>3 - Complete (Complete): Downstream rate tuning succeeds.<br>4 - Fail (Fail): Downstream rate tuning fails.<br>Other values are reserved. |
| 6 | Response code (Response code) | Indicates a reason for rejecting a rate tuning request.<br>0 - ACK: The ONU accepts rate tuning.<br>1 - NACK: The ONU is busy.<br>2 - NACK: A target upstream sending rate is not supported.<br>3 - NACK: A target downstream receiving rate is not supported.<br>4 - NACK: A target upstream sending rate and a target downstream receiving rate are not supported.<br>Other values are reserved. |
| 7 | 000U 000D | Indicates a rate tuning result (U indicates a result of tuning an upstream sending rate. D indicates a result of tuning a downstream receiving rate).<br>0 indicates that a rate remains unchanged.<br>1 indicates that a rate is changed. |
| 8 | 00UU 00DD | Indicates a target upstream rate and a target downstream rate. For details, refer to the definition of the octet m + 2 in Table 1. |
| 9-40 | Padding | Be filled with all 0s by a transmitter, and be ignored by a receiver. |
| 41-48 | MIC | Indicates message integrity check (Message integrity check). |

In the PLOAM message format shown in Table 2, the octet 3 is used to indicate a type of a PLOAM message, that is, to indicate that the PLOAM message is a rate tuning response message; the octet 5 is an acknowledgment field, and the octet 6 is a rejection reason field. It can be seen from Table 2 that, the rate tuning response message may further include a rate tuning result indication field (an octet 7 in Table 2). That is, a same message format may be used for the rate tuning response message and a tuning result indication message (referring to step 210). In this case, when the rejection reason field (the octet 6 in Table 2) indicates that the ONU rejects the rate tuning, the OLT atomically ignores the rate tuning result indication field.

It should be noted that, in this embodiment, the rate tuning response message includes the acknowledgment field and the rejection reason field. In another embodiment, the rate tuning response message may only include the acknowledgment field alternatively.

Step 207: The OLT tunes the downstream sending rate to the target downstream rate, and the ONU tunes the downstream receiving rate to the target downstream rate.

In this embodiment, in the rate tuning request, the value of the particular bit of the downstream superframe counter is used as the condition for starting the rate tuning. Therefore, the tuning, by the OLT, the downstream sending rate to the target downstream rate includes detecting, by the OLT, a superframe counter field in a downstream frame header sent to the ONU, where when a value of a particular bit of the superframe counter field is the same as the value of the rate tuning start moment field, the OLT tunes the downstream sending rate to the target downstream rate.

Correspondingly, tuning, by the ONU, the downstream receiving rate to the target downstream rate includes receiving, by the ONU, a downstream frame sent by the OLT and detecting a superframe counter field in a received downstream frame header, and when a value of a particular bit of the superframe counter field is the same as the value of the rate tuning start moment field, tuning, by the ONU, the downstream receiving rate to the target downstream rate.

Figure 3B:
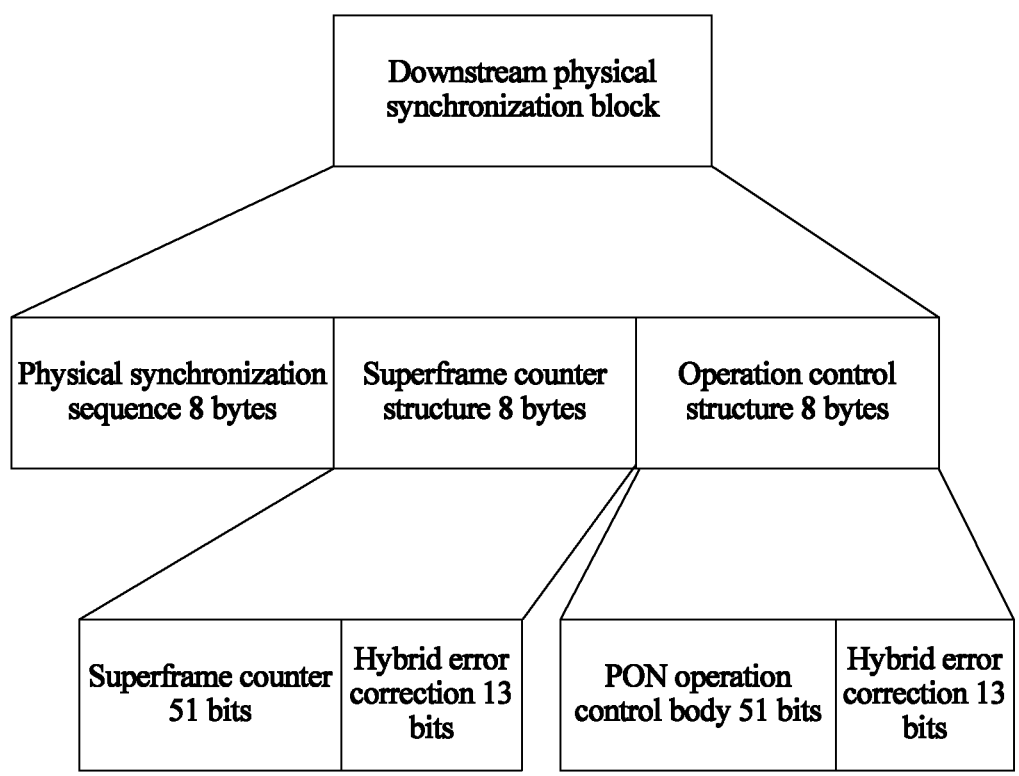
FIG. 3B is a schematic structural diagram of a downstream frame header in Embodiment 2 of the present disclosure.

It may be understood that, the downstream frame generally includes a frame header and a payload, where a format of the downstream frame header is shown in FIG. 3B.

To avoid affecting a downstream service, when starting to tune the downstream sending rate, the OLT buffers data to be sent to the ONU in the transmit buffer corresponding to the ONU, and after normal communication is restored (for example, after downstream synchronization in step 208 succeeds), sends, to the ONU, the data in the transmit buffer corresponding to the ONU.

Step 208: The OLT sends a downstream frame using a tuned downstream sending rate (that is, data is transmitted on a line between the OLT and the ONU according to the target downstream rate), and the ONU performs downstream synchronization using a tuned downstream receiving rate; if the downstream synchronization fails, the ONU performs step 209 and step 210; or if the downstream synchronization succeeds, the ONU performs step 210 and receives downstream service data using the tuned rate.

The downstream synchronization refers to that the ONU receives the downstream frame using the tuned downstream receiving rate. If a correct downstream frame delimitation can be obtained by parsing the received downstream frame, it indicates that the synchronization succeeds; or if no correct downstream frame delimitation can be obtained by parsing the received downstream frame, it indicates that the synchronization fails.

If the OLT buffers, when starting to tune the downstream sending rate, the data to be sent to the ONU, the downstream frame sent by the OLT after completing the rate tuning may be a test frame, for example, a null data frame, so that the ONU can perform the downstream synchronization.

Step 209: The ONU receives data using the downstream receiving rate before the tuning or a preset default receiving rate.

The ONU may select, according to the rollback flag in the rate tuning request message, a rate that is used when the tuning fails.

Step 210: The ONU sends a tuning result indication message to the OLT, where the tuning result indication message is used to indicate whether the rate tuning succeeds or not.

As described above, the message format in Table 2 or a separate PLOAM message may be used for the tuning result indication message.

Step 211: When the OLT receives the tuning result indication message sent by the ONU and the received tuning result indication message indicates that the rate tuning fails, the OLT sends downstream data using the downstream sending rate before the tuning or a preset default sending rate.

When the OLT receives the tuning result indication message sent by the ONU and the received tuning result indication message indicates that the rate tuning succeeds, the OLT sends, to the ONU, the data that is buffered in the transmit buffer when the rate tuning starts, so as to restore the normal communication.

Likewise, the OLT may select, according to the rollback flag in a tuning indication request, a rate that is used when the tuning fails.

It should be noted that, in this embodiment, whether the rate tuning succeeds or not, the ONU sends the tuning result indication message to the OLT. In another embodiment, the ONU may alternatively send the tuning result indication message to the OLT only when the rate tuning succeeds. In this case, if the OLT receives no message within specified time, the OLT determines that the rate tuning fails and sends data using the downstream sending rate before the tuning or the preset default sending rate.

Preferably, the tuning result indication message may also be sent using the AMCC channel.

Further, if the ONU sends the tuning result indication message to the OLT only when the rate tuning succeeds, the tuning result indication message may also be implemented using a PLOAM message. A format of the PLOAM message used as the tuning result indication message is shown in Table 3.

TABLE 3

| Octet | Content | Description |
| --- | --- | --- |
| 1 and 2 | ONU-ID | Indicates a unicast message from an ONU. |
| 3 | Message type ID | Indicates a line rate tuning success (Line_rate_Complete_u). |
| 4 | SeqNo | Indicates a unicast PLOAM sequence number. |
| 5 | 00UU 00DD | Indicates a target upstream rate and target downstream rate. For details, refer to the definition of the octet m + 2 in Table 1. |
| 6-40 | Padding | Be filled with all 0s by a transmitter, and be ignored by a receiver. |
| 41-48 | MIC | Indicates message integrity check (Message integrity check). |

In the PLOAM message format shown in Table 3, the octet 3 is used to indicate a type of the PLOAM message, that is, to indicate that the PLOAM message is a tuning result indication message used to indicate that the rate tuning succeeds. The octet 5 of the message is used to indicate upstream rate tuning or downstream rate tuning.

It may be understood that, during initialization of a service channel between the OLT and the ONU, a preset default line rate is used to transmit data. The default line rate may be a maximum line rate that is supported by the ONU and a first OLT, a minimum line rate that is supported by the ONU and a first OLT, or an intermediate line rate between a maximum line rate and a minimum line rate that are supported by the ONU and a first OLT.

It should be noted that, in this embodiment, the first PON equipment is an OLT, and the second PON equipment is an ONU. In another embodiment, the first PON equipment may be an ONU, and the second PON equipment may be an OLT. In this case, a rate tuning process is similar to that in this embodiment, and therefore detailed descriptions are omitted herein.

In this embodiment of the present disclosure, a target downstream rate is determined according to downstream data transmission information between an OLT and an ONU, and data is transmitted on a line between the OLT and the ONU according to the target downstream rate, so that a downstream line rate may be tuned according to real-time downstream data transmission information between the OLT and the ONU. The downstream line rate is decreased when downstream service traffic between the OLT and the ONU is relatively small, so that idle signals sent by the ONU can be reduced to achieve energy conservation; or the downstream line rate is increased when service traffic between the OLT and the ONU is relatively large, so that communication latency of the ONU can be reduced and a packet loss can be avoided, thereby improving reliability of communication. In addition, because a rate tuning request is sent using an AMCC, a protocol in an existing PtP WDM-PON does not need to be changed. This is applicable to popularization and application.

Embodiment 3

Figure 4:
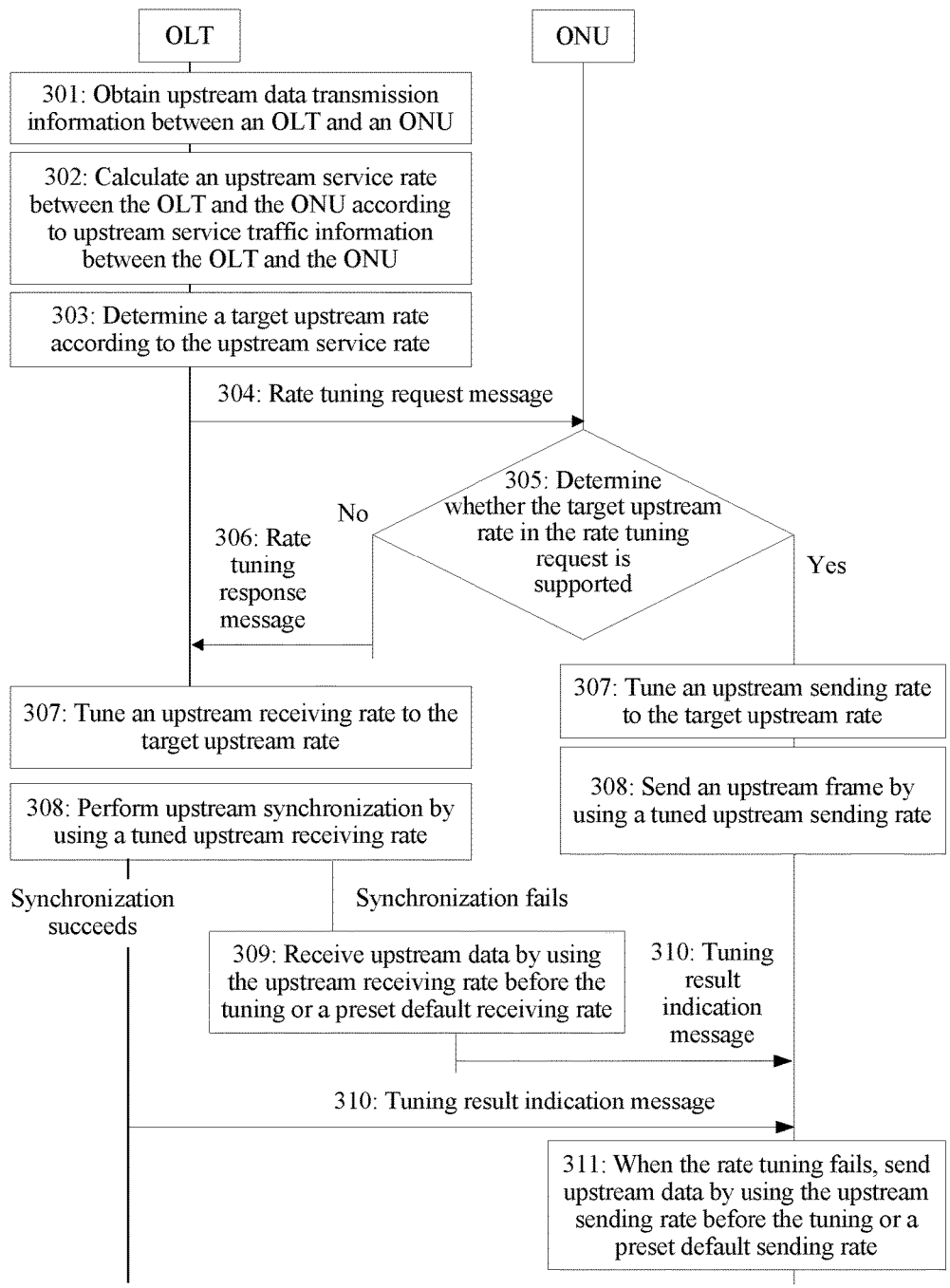
FIG. 4 is a flowchart of a data transmission control method according to Embodiment 3 of the present disclosure.

This embodiment of the present disclosure provides a data transmission method. In this embodiment, first PON equipment is an OLT, and second PON equipment is an ONU. In this embodiment, the present disclosure is described using an example of turning an upstream line rate (that is, an upstream receiving rate of the OLT and an upstream sending rate of the ONU) between the first PON equipment and the second PON equipment according to upstream data transmission information between the first PON equipment and the second PON equipment. Referring to FIG. 4, the method includes the following steps.

Step 301: The OLT obtains the upstream data transmission information between the OLT and the ONU.

The upstream data transmission information may include at least one of upstream service traffic information between the OLT and the ONU, or transmit buffer occupancy information of the ONU.

The upstream service traffic information may include a quantity and a size of service packets sent to the OLT by the ONU within a specified duration; and the transmit buffer occupancy information of the ONU includes a transmit buffer occupancy rate of the ONU or a data volume in a transmit buffer of the ONU. The transmit buffer occupancy rate of the ONU refers to a ratio of a current data volume in the transmit buffer of the ONU to a total capacity of the transmit buffer of the ONU.

The upstream service traffic information of the ONU may include at least one of a quantity and a size of upstream service packets of the ONU that are received within the specified duration, or transmit buffer occupancy information of the ONU within the specified duration. The transmit buffer occupancy information of the ONU is the transmit buffer occupancy rate of the ONU or the data volume in the transmit buffer of the ONU.

As described above, one OLT communicates with multiple ONUs, and the ONU in step 301 may be any one of the multiple ONUs that communicate with the OLT.

The specified duration may be set according to an actual situation, for example, to 2 s or 5 s.

When the upstream data transmission information includes the transmit buffer occupancy information of the ONU within the specified duration, the ONU may periodically send a transmit buffer status message to the OLT to report the transmit buffer occupancy information of the ONU. The transmit buffer status message may also be implemented using a PLOAM message, where a message format of the PLOAM message may be shown in Table 4.

TABLE 4

| Octet | Content | Description |
| --- | --- | --- |
| 1 and 2 | ONU-ID | Indicates a unicast message from an ONU. |
| 3 | Message type ID | Indicates a buffer report. |

TABLE 4-continued

| Octet | Content | Description |
|---|---|---|
| 4 | SeqNo | Indicates a unicast PLOAM sequence number. |
| 5-n | Buffer status (Buffer status) | May be a buffer data volume (unit: 32 bits) or buffer occupancy (unit: %). |
| n + 1-40 | Padding | Be filled with all 0s by a transmitter, and be ignored by a receiver. |
| 41-48 | MIC | Indicates message integrity check. |

In the message format shown in Table 4, the octet 3 is used to indicate a type of the PLOAM message, that is, to indicate that the PLOAM message is a transmit buffer status message. The Octets 5-n are used to carry a buffer data volume or buffer occupancy.

Preferably, the transmit buffer status message may also be sent using an AMCC channel.

Step 302: The OLT calculates an upstream service rate between the OLT and the ONU according to the upstream service traffic information between the OLT and the ONU.

In a first implementation manner, the upstream data transmission information is the upstream service traffic information between the OLT and the ONU (that is, a quantity and a size of upstream service packets sent to the OLT by the ONU within the specified duration). In this case, step 302 may include calculating an average rate of an upstream service according to the quantity and the size of the upstream service packets that are sent by the ONU and that are received by the OLT within the specified duration, where the average rate of the upstream service is the upstream service rate.

For example, it is assumed that the OLT receives, within 2 s, ten 500-byte packets and five 1000-byte packets that are sent by the ONU; in this case, the average rate of the upstream service is (10×500×8+5×1000×8)÷ 2=40000 bps.

In a second implementation manner, the upstream data transmission information is the transmit buffer occupancy information of the ONU. In this case, step 302 may include calculating the upstream service rate according to the transmit buffer occupancy information of the ONU and a current line rate.

A specific calculation manner is similar to the calculation manner of the downstream service rate in the second implementation manner of step 202, and detailed descriptions are omitted herein.

In a third implementation manner, the upstream data transmission information includes the upstream service traffic information between the OLT and the ONU and the transmit buffer occupancy information of the ONU. In this case, step 302 may include, when the buffer data volume or occupancy is 0 within the specified duration, calculating the upstream service rate in the first implementation manner; or when the buffer data volume or occupancy is not 0 within the specified duration, calculating the upstream service rate in the second implementation manner.

This embodiment of the present disclosure is not only limited to the foregoing three implementation manners. The first implementation manner and the second implementation manner may also be combined in another way.

Step 303: The OLT determines a target upstream rate between the OLT and the ONU according to the upstream service rate between the OLT and the ONU.

A method for determining the target upstream rate is the same as the method for determining the target downstream rate in step 203, and detailed descriptions are omitted herein.

The determining the target upstream rate between the OLT and the ONU according to the upstream data transmission information between the OLT and the ONU can be implemented by means of step 302 and step 303.

Step 304: When the target upstream rate is different from a current line rate (that is, a current upstream line rate between the OLT and the ONU), the OLT sends a rate tuning request message to the ONU.

The rate tuning request message includes a target line rate field. The target line rate field carries a target line rate and is used to instruct the ONU to tune the current line rate to the target line rate.

In this embodiment, the target line rate field carries the target upstream rate and is used to instruct the ONU to tune the upstream sending rate to the target upstream rate.

In step 304, the OLT compares the target upstream rate with a current upstream receiving rate of the OLT, and if the target upstream rate is the same as the current upstream receiving rate of the OLT, keeps receiving data using the current receiving rate, so as to maintain normal communication; or if the target upstream rate is different from the current upstream receiving rate of the OLT, sends the rate tuning request message to the ONU.

Preferably, the rate tuning request may be sent using the AMCC. It is easy to learn that, the rate tuning request message may be alternatively sent using another control channel. No limitation is imposed thereto in this embodiment of the present disclosure.

In addition, in this embodiment, the rate tuning request message may further include a rate tuning start moment field used to carry a condition for starting the rate tuning. A value of the rate tuning start moment field is preferably a value of a particular bit of a downstream superframe counter. The particular bit may be all bits or a part of bits of the downstream superframe counter. When the value of the rate tuning start moment field is set to the value of the particular bit of the downstream superframe counter, the ONU starts to tune a rate when a value of a particular bit of a superframe counter field in a received downstream frame header is the same as the value of the rate tuning start moment field.

In another embodiment, the value of the rate tuning start moment field may be alternatively a time value, and a rate starts to be tuned at a moment corresponding to the time value; or a rate may be further tuned according to an agreed condition. For example, the rate tuning request message carries a time stamp, and it is agreed that the rate is tuned at a specified moment after time indicated by the time stamp. No limitation is imposed thereto in the present disclosure.

The rate tuning request message may further include a rollback flag. The rollback flag is used to indicate a line rate that is used when the rate tuning by the ONU fails. For example, if the rollback flag is 1, it indicates that if the rate tuning fails, a rate before the tuning is restored; or if the rollback flag is 0, it indicates that if the rate tuning fails, a preset default rate is restored.

Preferably, the format in Table 1 may be used for a message format of the rate tuning request message.

Step 305: The ONU determines whether the target upstream rate in the rate tuning request is supported, and when the ONU does not support the target upstream rate, performs step 306; or when the ONU supports the target upstream rate, performs step 307.

Optionally, before step 305, the method may further include determining, by the ONU, whether the target upstream rate is the same as the current upstream sending rate of the ONU, and if the target upstream rate is different from the current upstream sending rate of the ONU, performing step 305, or if the target upstream rate is the same as the current upstream sending rate of the ONU, continuing, by the ONU, to use the current sending rate to send data.

Step 306: The ONU sends a rate tuning response message to the OLT.

The rate tuning response message. The acknowledgment field is used to indicate whether the ONU accepts the rate tuning; in step 306, the acknowledgment field is used to indicate that the ONU rejects the rate tuning.

Optionally, the rate tuning response message may further include a rejection reason field. The rejection reason field is used to carry a reason for rejecting, by the ONU, the rate tuning, for example, the ONU is busy, or the target upstream rate is not supported.

Optionally, after step 305, when the ONU supports the target upstream rate, the method may further include sending, by the ONU, a rate tuning response message to the OLT, where an acknowledgment field in the rate tuning response message is used to indicate that the ONU accepts the rate tuning.

Preferably, the rate tuning message is also sent using the AMCC channel.

During implementation, the rate tuning response message may also be implemented using a PLOAM message. The PLOAM message format in Table 2 may be used.

Step 307: The OLT tunes the upstream receiving rate to the target upstream rate, and the ONU tunes the upstream sending rate to the target upstream rate.

In this embodiment, in the rate tuning request message, the value of the particular bit of the downstream superframe counter is used as the condition for starting the rate tuning. Therefore, that the OLT tunes the upstream receiving rate to the target upstream rate includes:

The OLT detects a superframe counter field in a downstream frame header sent to the ONU. When a value of a particular bit of the superframe counter field is the same as the value of the rate tuning start moment field, the OLT tunes the upstream receiving rate to the target upstream rate.

Correspondingly, tuning, by the ONU, the upstream sending rate to the target upstream rate includes detecting, by the ONU, a superframe counter field in a received downstream frame header sent by the OLT, and when a value of a particular bit of the superframe counter field is the same as the value of the rate tuning start moment field, tuning, by the ONU, the upstream sending rate to the target upstream rate.

To avoid affecting an upstream service, when starting to tune the upstream sending rate, the ONU stores data to be sent to the OLT in the transmit buffer of the ONU, and after normal communication is restored (for example, after upstream synchronization in step 308 succeeds), sends the data in the transmit buffer to the OLT.

Step 308: The ONU sends an upstream frame using a tuned upstream sending rate, and the OLT performs upstream synchronization using a tuned upstream receiving rate; if the upstream synchronization fails, the OLT performs step 309 and step 310; or if the upstream synchronization succeeds, the OLT performs step 310 and receives upstream service rate using the tuned rate.

The upstream synchronization refers to that the OLT receives the upstream frame using the tuned upstream receiving rate. If a correct upstream frame delimitation can be obtained by parsing the received upstream frame, it indicates that the upstream synchronization succeeds; or if no correct upstream frame delimitation can be obtained by parsing the received upstream frame, it indicates that the upstream synchronization fails.

If the ONU buffers, when starting to tune the upstream sending rate, the data to be sent to the OLT, the downstream frame sent by the ONU after completing the rate tuning may be a test frame, for example, a null data frame, so that the OLT can perform the downstream synchronization.

Step 309: The OLT receives upstream data using the upstream receiving rate before the tuning or a preset default receiving rate.

The OLT may select, according to the rollback flag in the tuning indication request message, a rate that is used when the tuning fails.

Step 310: The OLT sends a tuning result indication message to the ONU. The tuning result indication message is used to indicate whether the rate tuning succeeds or not. The message format in Table 2 or a separate PLOAM message may be used for the tuning result indication message.

Step 311: When the ONU receives the tuning result indication message sent by the OLT and the received tuning result indication message indicates that the rate tuning fails, the ONU sends upstream data using the upstream sending rate before the tuning or a preset default sending rate.

When the ONU receives the tuning result indication message sent by the OLT and the received tuning result indication message indicates that the rate tuning succeeds, the ONU sends, to the OLT, the data that is buffered in the transmit buffer when the rate tuning starts, so as to restore the normal communication.

Likewise, the ONU may select, according to the rollback flag in a tuning indication request, a rate that is used when the tuning fails.

In this embodiment, the format in Table 2 may be used for a message format of the tuning result indication message. In another embodiment, a format in Table 5 may be alternatively used for the message format of the tuning result indication message.

TABLE 5

| Octet | Content | Description |
| --- | --- | --- |
| 1 and 2 | ONU-ID | Indicates a unicast message to an ONU. |
| 3 | Message type ID | Indicates a line rate tuning result indication (Line_rate_Tuning_Notify). |
| 4 | SeqNo | Indicates a unicast PLOAM sequence number. |
| 5 | Operation Code | 0 - Complete: Upstream rate tuning succeeds. 1 - Fail: Upstream rate tuning fails. Other values are reserved. |
| 6 | 000U 000D | Indicates a rate tuning result (U Indicates a result of tuning an upstream receiving rate. D Indicates a result of tuning a downstream sending rate). 0 - The rate remains unchanged. 1 - The rate is changed. |
| 7 | 00UU 00DD | Indicates a target upstream rate and a target downstream rate. For details, refer to the definition of the octet m + 2 in Table 1. |
| 8-40 | Padding | Be filled with all 0s by a transmitter, and be ignored by a receiver. |
| 41-48 | MIC | Indicates message integrity check. |

In the PLOAM message format shown in Table 5, the octet 3 is used to indicate a type of a PLOAM message, that is, to indicate that the PLOAM message is a tuning result indication message. The octet 5 of the message is used to indicate whether the tuning succeeds or not, and the octet 6 of the message is used to indicate a rate tuning result, that is, whether a rate is changed.

It should be noted that, in this embodiment, whether the rate tuning succeeds or not, the OLT sends the tuning result indication message to the ONU. In another embodiment, the OLT may alternatively send the tuning result indication message to the ONU only when the rate tuning succeeds. In this case, if the ONU does not receives no message within specified time, the ONU determines that the rate tuning fails and sends data using the upstream sending rate before the tuning or the preset default sending rate.

Further, if the ONU sends the tuning result indication message to the OLT only when the rate tuning succeeds, the message format of the tuning result indication message is shown in Table 3.

It may be understood that, during initialization of a service channel between the OLT and the ONU, a preset default line rate is used to transmit data. The default line rate may be a maximum line rate that is supported by the ONU and a first OLT, a minimum line rate that is supported by the ONU and a first OLT, or an intermediate line rate between a maximum line rate and a minimum line rate that are supported by the ONU and a first OLT.

It should be noted that, in this embodiment, the first PON equipment is an OLT, and the second PON equipment is an ONU. In another embodiment, the first PON equipment may be an ONU, and the second equipment may be an OLT. In this case, a rate tuning process is similar to that in this embodiment, and therefore detailed descriptions are omitted herein.

In this embodiment of the present disclosure, a target upstream rate is determined according to upstream data transmission information between an OLT and an ONU, and data is transmitted on a line between the OLT and the ONU according to the target upstream rate, so that an upstream line rate may be tuned according to real-time upstream data transmission information between the OLT and the ONU. The upstream line rate is decreased when upstream service traffic between the OLT and the ONU is relatively small, so that idle signals sent by the ONU can be reduced to achieve energy conservation; or the upstream line rate is increased when service traffic between the OLT and the ONU is relatively large, so that communication latency of the ONU can be reduced and a packet loss can be avoided, thereby improving reliability of communication. Because a rate tuning request is sent using an AMCC, a protocol in an existing PtP WDM-PON does not need to be changed. This is applicable to popularization and application.

Embodiment 4

Figure 5:
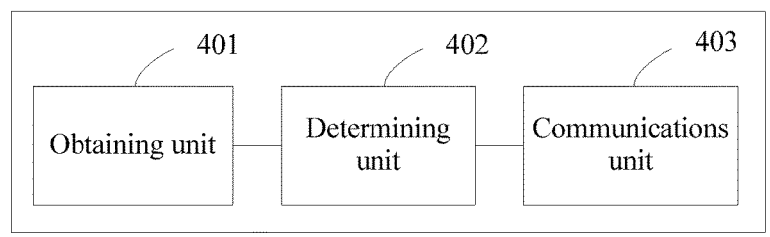
FIG. 5 is a schematic structural diagram of PON equipment according to Embodiment 4 of the present disclosure.

This embodiment of the present disclosure provides PON equipment, which is suitable for implementing the method provided in Embodiment 1. Referring to FIG. 5, the equipment includes an obtaining unit 401, a determining unit 402, and a communications unit 403.

The obtaining unit 401 is configured to obtain data transmission information between the PON equipment and second PON equipment.

The data transmission information may include at least one of service traffic information between the PON equipment and the second PON equipment, transmit buffer occupancy information of the PON equipment, or transmit buffer occupancy information of the second PON equipment.

The service traffic information may include a quantity and a size of service packets transmitted between the PON equipment and the second PON equipment within a specified duration; the transmit buffer occupancy information of the PON equipment includes transmit buffer occupancy rate of the PON equipment or a data volume in a transmit buffer of the PON equipment; and the transmit buffer occupancy information of the second PON equipment includes transmit buffer occupancy rate of the second PON equipment or a data volume in a transmit buffer of the second PON equipment.

It should be noted that, the data transmission information between the PON equipment and the second PON equipment may include upstream data transmission information and downstream data transmission information.

The determining unit 402 is configured to determine a target line rate between the PON equipment and the second PON equipment according to the data transmission information obtained by the obtaining unit 401.

The determining unit 402 is configured to determine a target upstream rate according to the upstream data transmission information, and determine a target downstream rate according to the downstream data transmission information.

The communications unit 403 is configured to transmit data on a line between first PON equipment and the second PON equipment according to the target line rate determined by the determining unit 402.

In this embodiment, when the PON equipment is an OLT, the second PON equipment is an ONU; or when the PON equipment is an ONU, the second PON equipment is an OLT.

In this embodiment of the present disclosure, a target line rate is determined according to data transmission information between first PON equipment and second PON equipment, and data is transmitted on a line between the first PON equipment and the second PON equipment according to the target line rate, so that a line rate may be tuned according to real-time service traffic between an OLT and an ONU. The line rate is decreased when the service traffic between the OLT and the ONU is relatively small, so that idle signals sent by the ONU can be reduced to achieve energy conservation; or the line rate is increased when the service traffic between the OLT and the ONU is relatively large, so that communication latency of the ONU can be reduced and a packet loss can be avoided, thereby improving reliability of communication.

Embodiment 5

Figure 6:
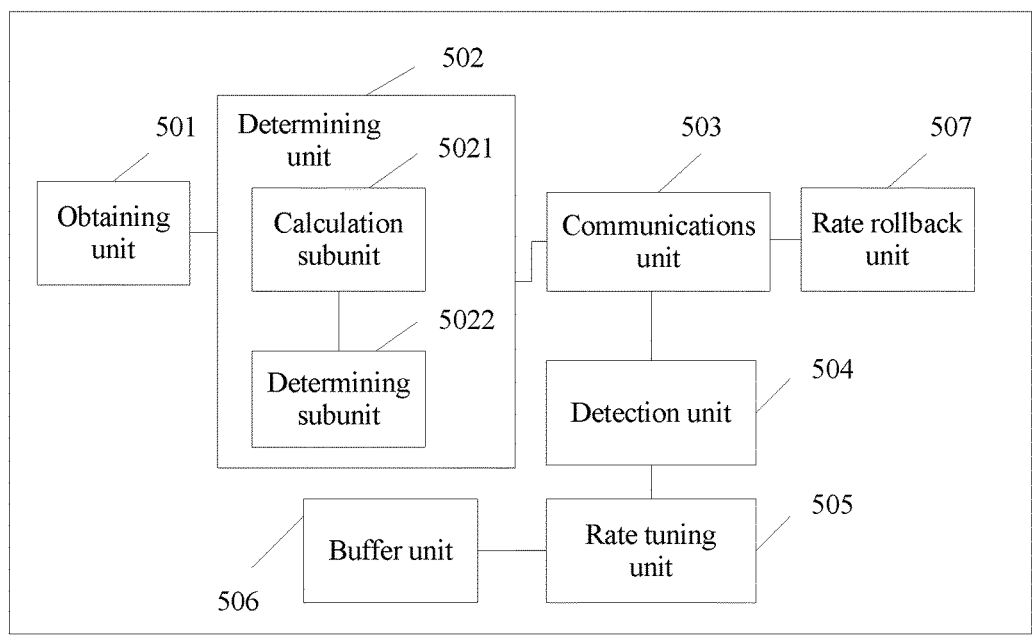
FIG. 6 is a schematic structural diagram of PON equipment according to Embodiment 5 of the present disclosure.

This embodiment of the present disclosure provides PON equipment, which is suitable for implementing the method implemented by an OLT in Embodiment 2 or Embodiment 3. Referring to FIG. 6, the equipment includes an obtaining unit 501, a determining unit 502, and a communications unit 503.

The obtaining unit 501 is configured to obtain data transmission information between an OLT and an ONU.

The data transmission information may include at least one of service traffic information between the PON equipment and second PON equipment, transmit buffer occupancy information of the PON equipment, or transmit buffer occupancy information of the second PON equipment.

The service traffic information may include a quantity and a size of service packets transmitted between the PON equipment and the second PON equipment within a specified duration; the transmit buffer occupancy information of the PON equipment includes a transmit buffer occupancy rate of the PON equipment or a data volume in a transmit buffer of the PON equipment; and the transmit buffer occupancy information of the second PON equipment includes a transmit buffer occupancy rate of the second PON equipment or a data volume in a transmit buffer of the second PON equipment.

It should be noted that, the data transmission information between the PON equipment and the second PON equipment may include upstream data transmission information and downstream data transmission information.

The determining unit 502 is configured to determine a target line rate between the PON equipment and the second PON equipment according to the data transmission information obtained by the obtaining unit 501.

The communications unit 503 is configured to transmit data on a line between the PON equipment and the second PON equipment according to the target line rate determined by the determining unit 502.

In this embodiment, when the PON equipment is an OLT, the second PON equipment is an ONU; or when the PON equipment is an ONU, the second PON equipment is an OLT.

Further, the determining unit 502 may include a calculation subunit 5021 and a determining subunit 5022. The calculation subunit 5021 is configured to calculate a service rate between the PON equipment and the second PON equipment according to the service traffic information. The determining subunit 5022 is configured to determine the target line rate between the PON equipment and the second PON equipment according to the service rate calculated by the calculation unit 5021.

The calculation unit 5021 calculates an upstream service rate between the PON equipment and the second PON equipment according to the upstream data transmission information between the PON equipment and the second PON equipment (for a specific calculation manner, refer to step 302 in Embodiment 3), and calculates a downstream service rate between the PON equipment and the second PON equipment according to the downstream data transmission information between the PON equipment and the second PON equipment (for a specific calculation manner, refer to step 202 in Embodiment 2).

In an implementation manner of this embodiment, the determining subunit 5022 is configured to, when the service rate is less than a current line rate between the PON equipment and the second PON equipment, use a lowest line rate that is greater than the service rate and that is in line rates supported by the PON equipment and the second PON equipment, as the target line rate.

In a preferred implementation manner of this embodiment, the determining subunit 5033 is further configured to, when the service rate is greater than a current line rate between the PON equipment and the second PON equipment and the transmit buffer occupancy rate of the PON equipment reaches a specified threshold, use a lowest line rate that is greater than the service rate and that is in line rates supported by the PON equipment and the second PON equipment, as the target line rate.

In an optional implementation manner of this embodiment, the determining subunit 5033 may alternatively directly use a lowest line rate that is greater than the service rate and that is in line rates supported by the PON equipment and the second PON equipment, as the target line rate.

The determining subunit 5022 determines a target downstream rate between the PON equipment and the second PON equipment according to step 203 in Embodiment 2, and determines a target upstream rate between the PON equipment and the second PON equipment according to step 303 in Embodiment 3, and details are not repeatedly described herein.

In an implementation manner of this embodiment of the present disclosure, the communications unit 503 is further configured to, when the target line rate is different from a current line rate between the PON equipment and the second PON equipment, send a rate tuning request message to the second PON equipment. The rate tuning request message includes a target line rate field, and the target line rate field carries the target line rate and is used to instruct the second PON equipment to tune the current line rate to the target line rate.

Optionally, the rate tuning request message may further include a rate tuning start moment field or a rollback flag. The rate tuning start moment field is used to carry a condition for starting the rate tuning, and the rollback flag is used to indicate a line rate that is used when the second PON equipment fails in the rate tuning.

A value of the rate tuning start moment field is preferably a value of a particular bit of a downstream superframe counter. The particular bit may be all bits or a part of bits of the downstream superframe counter. When the value of the rate tuning start moment field is set to the value of the particular bit of the downstream superframe counter, the ONU starts to tune a rate when a value of a particular bit of a superframe counter field in a received downstream frame header is the same as the value of the rate tuning start moment field.

In another embodiment, the value of the rate tuning start moment field may be alternatively a time value, and a rate starts to be tuned at a moment corresponding to the time value; or a rate may be further tuned according to an agreed condition. For example, the rate tuning request message carries a time stamp, and it is agreed that the rate is tuned at a specified moment after time indicated by the time stamp. No limitation is imposed thereto in the present disclosure.

The rollback flag is used to indicate the line rate that is used when the rate tuning by the ONU fails. For example, if the rollback flag is 1, it indicates that if the rate tuning fails, a rate before the tuning is restored; or if the rollback flag is 0, it indicates that if the rate tuning fails, a preset default rate is restored.

In this embodiment, the rate tuning request message may be implemented using the PLOAM message format in Table 1.

Preferably, the communications unit 503 is configured to send a rate tuning request to the second PON equipment using an AMCC. The AMCC is a newly added out-of-band control channel in a PtP WDM-GON system, and can be carried in an optical carrier in which data is the same as data in a service channel using another modulation technology such as a sub-carrier modulation technology. Generally, low-power and low-frequency modulation may be used, so as to ensure that normal transmission on the service channel is not affected when a wavelength is used, and caused power consumption and power can be ignored. It is easy to learn that, the rate tuning request may be alternatively sent using another control channel. No limitation is imposed thereto in this embodiment of the present disclosure.

In this embodiment, the communications unit 503 is further configured to receive a rate tuning response message sent by the second PON equipment. The rate tuning response message includes an acknowledgment field or a rejection reason field. The acknowledgment field is used to indicate whether the second PON equipment accepts the rate tuning, and the rejection reason field is used to carry a reason for rejecting, by the second PON equipment, the rate tuning, for example, the ONU is busy, or the target downstream rate is not supported.

During implementation, the PLOAM message format in Table 2 may be used for the rate tuning response message. Preferably, the rate tuning message is also sent using the AMCC channel.

In this embodiment, the equipment may further include a detection unit 504 and a rate tuning unit 505. The detection unit 504 is configured to detect the superframe counter field in the downstream frame header sent to the ONU. The rate tuning unit 505 is configured to start to tune a rate when the value of the particular bit of the superframe counter field is the same as the value of the rate tuning start moment field.

Preferably, the equipment may further include a buffer unit 506 configured to, when the rate tuning starts, buffer data to be sent to the second PON equipment.

The communications unit 503 is further configured to send the buffered to-be-sent data to the second PON equipment after normal communication is restored. For details, refer to step 207 and step 307, and detailed descriptions are omitted herein.

Optionally, the equipment may further include a rate rollback unit 507. The rate rollback unit 507 is configured to, when the rate tuning fails, transmit data using the line rate indicated by the rollback flag. For details, refer to step 209 to step 211 and step 309 to step 311, and detailed descriptions are omitted herein.

Optionally, the communications unit 503 may be further configured to receive a tuning result indication message sent by the second PON equipment (for details, refer to step 210 and step 211); or the communications unit 503 may be further configured to send a tuning result indication message to the second PON equipment (for details, refer to step 310 and step 311).

In this embodiment of the present disclosure, a target line rate is determined according to data transmission information between PON equipment and second PON equipment, and data is transmitted on a line between the PON equipment and the second PON equipment according to the target line rate, so that a line rate may be tuned according to real-time service traffic between the PON equipment and the second PON equipment. The line rate is decreased when the service traffic between the PON equipment and the second PON equipment is relatively small, so that idle signals sent by an ONU can be reduced to achieve energy conservation; or the line rate is increased when the service traffic between the PON equipment and the second PON equipment is relatively large, so that communication latency between the PON equipment and the second PON equipment can be reduced and a packet loss can be avoided, thereby improving reliability of communication. In addition, because a rate tuning request is sent using an AMCC, a protocol in an existing PtP WDM-PON does not need to be changed. This is applicable to popularization and application.

It should be noted that, when the PON equipment provided in the foregoing embodiment transmits data, division of the foregoing functional modules is only used as an example for description. In an actual application, the functions may be allocated to different functional modules for implementation as required. To be specific, an internal structure of the PON equipment is divided into different functional modules to implement all or a part of the functions described above. In addition, the PON equipment provided in the foregoing embodiment pertains to a same concept as the embodiment of the data transmission control method, and for a specific implementation process of the data transmission control apparatus, refers to the method embodiment. This is not repeatedly described herein.

Embodiment 6

Figure 7:
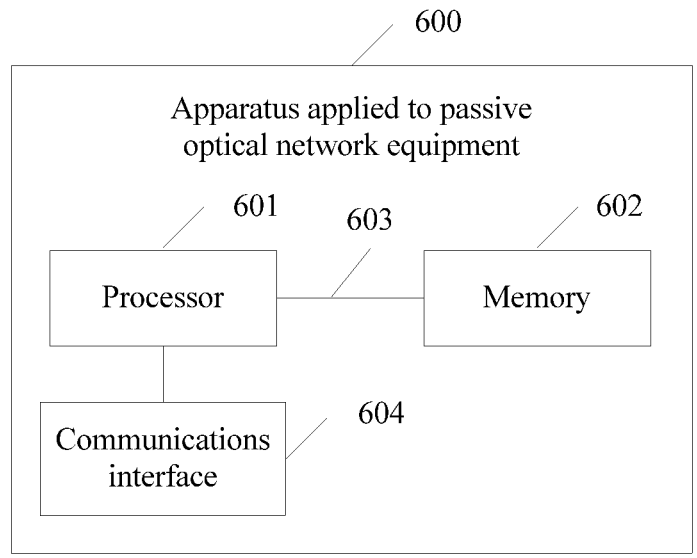
FIG. 7 is a schematic structural diagram of an apparatus applied to PON equipment according to Embodiment 6 of the present disclosure.

This embodiment of the present disclosure provides an apparatus 600 applied to PON equipment. Referring to FIG. 7, the apparatus includes a processor 601, a memory 602, a bus 603, and a communications interface 604. The memory 602 is configured to store an execution instruction of a computer, the processor 601 is connected to the memory 602 using the bus 603, and when the computer runs, the processor 601 executes the execution instruction of the computer stored by the memory 602, so that the computer executes the method executed by the first PON equipment in Embodiment 1, Embodiment 2, or Embodiment 3.

In this embodiment of the present disclosure, a target line rate is determined according to data transmission information between PON equipment and second PON equipment, and data is transmitted on a line between the PON equipment and the second PON equipment according to the target line rate, so that a line rate may be tuned according to real-time service traffic between the PON equipment and the second PON equipment. The line rate is decreased when the service traffic between the PON equipment and the second PON equipment is relatively small, so that idle signals sent by an ONU can be reduced to achieve energy conservation; or the line rate is increased when the service traffic between the PON equipment and the second PON equipment is relatively large, so that communication latency between the PON equipment and the second PON equipment can be reduced and a packet loss can be avoided, thereby improving reliability of communication. In addition, because a rate tuning request is sent using an AMCC, a protocol in an existing PtP WDM-PON does not need to be changed. This is applicable to popularization and application.

Embodiment 7

Figure 8:
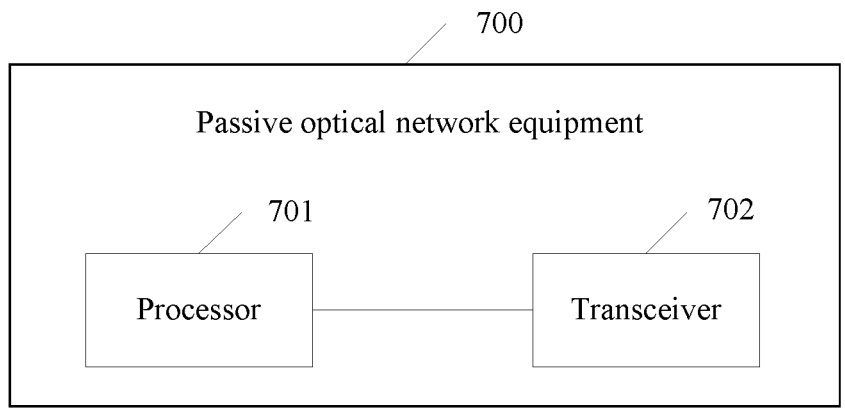
FIG. 8 is a schematic structural diagram of PON equipment according to Embodiment 7 of the present disclosure.
Figure 9:
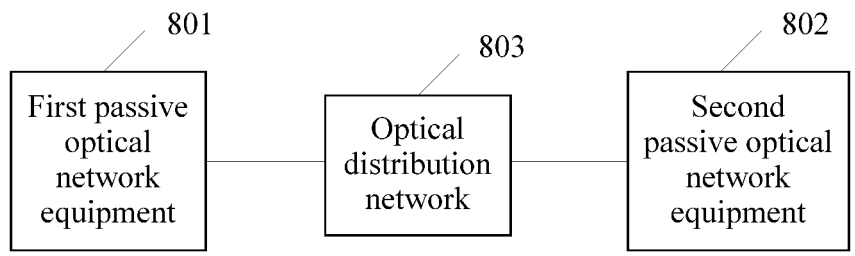
FIG. 9 is a schematic structural diagram of a passive optical network according to Embodiment 8 of the present disclosure.

This embodiment of the present disclosure provides PON equipment. Referring to FIG. 8, the equipment 700 includes a processor 701 and a transceiver 702.

The processor 701 may include the apparatus provided in Embodiment 6.

The processor 701 is configured to obtain data transmission information between the PON equipment and second PON equipment, determine a target line rate between the PON equipment and the second PON equipment according to the data transmission information, and instruct the transceiver to transmit data on a line between the PON equipment and the second PON equipment according to the target line rate. The data transmission information includes at least one of service traffic information between the PON equipment and the second PON equipment, transmit buffer occupancy information of the PON equipment, or transmit buffer occupancy information of the second PON equipment.

The transceiver 702 is configured to transmit the data on the line between the PON equipment and the second PON equipment according to the target line rate determined by the processor 701.

When the PON equipment is an OLT, the second PON equipment is an ONU; or when the PON equipment is an ONU, the second PON equipment is an OLT.

The service traffic information includes a quantity and a size of service packets transmitted between the PON equipment and the second PON equipment within a specified duration; the transmit buffer occupancy information of the PON equipment includes a transmit buffer occupancy rate of the PON equipment or a data volume in a transmit buffer of the PON equipment; and the transmit buffer occupancy information of the second PON equipment includes a transmit buffer occupancy rate of the second PON equipment or a data volume in a transmit buffer of the second PON equipment.

In some implementation manners of the present disclosure, the processor 701 is configured to calculate a service rate between the PON equipment and the second PON equipment according to the data transmission information, and determine the target line rate between the PON equipment and the second PON equipment according to the calculated service rate.

For the calculating a service rate between the PON equipment and the second PON equipment according to the data transmission information, refer to step 202 and step 302, for the determining the target line rate between the PON equipment and the second PON equipment according to the calculated service rate, refer to step 203 and step 303, and detailed descriptions are omitted herein.

In other implementation manners of the present disclosure, the processor 701 is configured to, when the service rate is greater than a current line rate between the PON equipment and the second PON equipment and the transmit buffer occupancy rate of the PON equipment reaches a specified threshold, or when the service rate is less than a current line rate between the PON equipment and the second PON equipment, use a lowest line rate that is greater than the service rate and that is in line rates supported by the PON equipment and the second PON equipment, as the target line rate.

In still other implementation manners of the present disclosure, the processor 701 is configured to use a lowest line rate that is greater than the service rate and that is in line rates supported by the PON equipment and the second PON equipment, as the target line rate.

In yet other implementation manners of the present disclosure, the processor 701 may be further configured to, when the target line rate is different from a current line rate, send a rate tuning request message to the second PON equipment. For content, a message format, and a sending manner of the rate tuning request message, refer to step 204 and step 304, and detailed descriptions are omitted herein.

In still yet other implementation manners of the present disclosure, the processor 701 may be further configured to tune a rate.

The transceiver 702 is further configured to, when the target line rate is different from a current line rate between the PON equipment and the second PON equipment, send a rate tuning request message to the second PON equipment. The rate tuning request message includes a target line rate field, and the target line rate field carries the target line rate and is used to instruct the second PON equipment to tune the current line rate to the target line rate.

Optionally, the rate tuning request message may further include a rate tuning start moment field or a rollback flag. The rate tuning start moment field is used to carry a condition for starting the rate tuning, and the rollback flag is used to indicate a line rate that is used when the second PON equipment fails in the rate tuning.

A value of the rate tuning start moment field is preferably a value of a particular bit of a downstream superframe counter. The particular bit may be all bits or a part of bits of the downstream superframe counter. When the value of the rate tuning start moment field is set to the value of the particular bit of the downstream superframe counter, the ONU starts to tune a rate when a value of a particular bit of a superframe counter field in a received downstream frame header is the same as the value of the rate tuning start moment field.

In another embodiment, the value of the rate tuning start moment field may be alternatively a time value, and a rate starts to be tuned at a moment corresponding to the time value; or a rate may be further tuned according to an agreed condition. For example, the rate tuning request message carries a time stamp, and it is agreed that the rate is tuned at a specified moment after time indicated by the time stamp. No limitation is imposed thereto in the present disclosure.

The rollback flag is used to indicate the line rate that is used when the rate tuning by the ONU fails. For example, if the rollback flag is 1, it indicates that if the rate tuning fails, a rate before the tuning is restored; or if the rollback flag is 0, it indicates that if the rate tuning fails, a preset default rate is restored.

In this embodiment, the rate tuning request message may be implemented using the PLOAM message format in Table 1.

Preferably, the transceiver 702 may send a rate tuning request to the second PON equipment using an AMCC. The AMCC is a newly added out-of-band control channel in a PtP WDM-GON system, and can be carried in an optical carrier in which data is the same as data in a service channel using another modulation technology such as a sub-carrier modulation technology. Generally, low-power and low-frequency modulation may be used, so as to ensure that normal transmission on the service channel is not affected when a wavelength is used, and caused power consumption and power can be ignored. It is easy to learn that, the rate tuning request may be alternatively sent using another control channel. No limitation is imposed thereto in this embodiment of the present disclosure.

In some implementation manners of the present disclosure, the transceiver 702 is further configured to receive a rate tuning response message sent by the second PON equipment. The rate tuning response message includes an acknowledgment field or a rejection reason field. The acknowledgment field is used to indicate whether the second PON equipment accepts the rate tuning, and the rejection reason field is used to carry a reason for rejecting, by the second PON equipment, the rate tuning, for example, the ONU is busy, or the target downstream rate is not supported.

During implementation, the PLOAM message format in Table 2 may be used for the rate tuning response message. Preferably, the rate tuning message is also sent using the AMCC channel.

In other implementation manners of the present disclosure, the processor 701 is further configured to detect the superframe counter field in the downstream frame header sent to the ONU, and start to tune a rate when the value of the particular bit of the superframe counter field is the same as the value of the rate tuning start moment field.

Optionally, the transceiver 702 may be further configured to receive a tuning result indication message sent by the second PON equipment (for details, refer to step 210 and step 211); or the transceiver 702 may be further configured to send a tuning result indication message to the second PON equipment (for details, refer to step 310 and step 311).

In still other implementation manners of the present disclosure, the PON equipment may further include a memory configured to, when the rate tuning starts, buffer data to be sent to the second PON equipment; the processor 701 may be further configured to, after normal communication is restored, instruct the transceiver 702 to send the buffered to-be-sent data to the second PON equipment.

In this embodiment of the present disclosure, a target line rate is determined according to data transmission information between PON equipment and second PON equipment, and data is transmitted on a line between the PON equipment and the second PON equipment according to the target line rate, so that a line rate may be tuned according to real-time service traffic of an ONU. The line rate is decreased when the service traffic between the PON equipment and the second PON equipment is relatively small, so that idle signals sent by an ONU can be reduced to achieve energy conservation; or the line rate is increased when the service traffic between the PON equipment and the second PON equipment is relatively large, so that communication latency of the ONU can be reduced and a packet loss can be avoided, thereby improving reliability of communication.

Embodiment 8

This embodiment of the present disclosure provides a passive optical network, which may include first PON equipment 801, second PON equipment 802, and an optical distribution network 803. The first PON equipment 801 is connected to the second PON equipment 802 using the optical distribution network 803.

When the first PON equipment 801 is an OLT, the second PON equipment 802 is an ONU; or when the first PON equipment 801 is an ONU, the second PON equipment 802 is an OLT.

For example, the first PON equipment 801 may be the PON equipment provided in Embodiment 4, Embodiment 5, or Embodiment 7.

It may be understood that, the first PON equipment 801 in this embodiment may provide all or a part of functions of the first PON equipment in the foregoing method embodiment, the second PON equipment 802 in this embodiment may provide all or a part of functions of the second PON equipment in the foregoing method embodiment, and a function of the first PON equipment 801 and a function of the second PON equipment 802 may be implemented according to the method in the foregoing method embodiment. For a specific implementation process of the functions, refer to the related description in the foregoing method embodiment, and details are not described herein.

In this embodiment of the present disclosure, a target line rate is determined according to data transmission information between first PON equipment and second PON equipment, and data is transmitted on a line between the first PON equipment and the second PON equipment according to the target line rate, so that a line rate may be tuned according to real-time service traffic between the first PON equipment and the second PON equipment. The line rate is decreased when the service traffic between the first PON equipment and the second PON equipment is relatively small, so that idle signals sent by an ONU can be reduced to achieve energy conservation; or the line rate is increased when the service traffic between the first PON equipment and the second PON equipment is relatively large, so that communication latency between the first PON equipment and the second PON equipment can be reduced and a packet loss can be avoided, thereby improving reliability of communication.

The sequence numbers of the foregoing embodiments of the present disclosure are only for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are embodiments of the present disclosure, but are not intended to limit the present disclosure. Any modification, equivalent replacement, and improvement made without departing from the—principle of the present disclosure shall fall within the protection scope of the present disclosure.

What is claimed is:

1. A data transmission method, applied to a point to point wavelength division multiplexing passive optical network, comprising:

obtaining, by a first passive optical network (PON) equipment, service traffic information between the first PON equipment and a second PON equipment;

determining, by the first PON equipment, a target line rate between the first PON equipment and the second PON equipment according to the service traffic information;

transmitting, by the first PON equipment, data on a line between the first PON equipment and the second PON equipment according to the target line rate, wherein the second PON equipment is an optical network unit (ONU) when the first PON equipment is an optical line terminal (OLT), or wherein the second PON equipment is an OLT when the first PON equipment is an ONU; and sending, by the first PON equipment, a rate tuning request message to the second PON equipment, wherein the rate tuning request message comprises an ONU identifier (ONU-ID), a rate tuning start moment field, and a target line rate field, wherein the target line rate field carries the target line rate, and wherein the rate tuning start moment field is used to carry a condition for starting a rate tuning.

2. The method according to claim 1, wherein the service traffic information comprises a quantity and a size of service packets transmitted between the first PON equipment and the second PON equipment within a specified duration.

3. The method according to claim 2, wherein determining the target line rate between the first PON equipment and the second PON equipment according to the service traffic information comprises:

calculating a service rate between the first PON equipment and the second PON equipment according to the service traffic information; and using a lowest line rate that is greater than the service rate and that is in line rates supported by the first PON equipment and the second PON equipment as the target line rate when the service rate is less than a current line rate between the first PON equipment and the second PON equipment.

4. The method according to claim 1, further comprising:

receiving, by the first PON equipment, a rate tuning response ACK physical layer operations administration and maintenance (PLOAM) message from the second PON equipment when the second PON equipment supports the target line rate; and receiving, by the first PON equipment, a rate tuning response NACK PLOAM message from the second PON equipment when the second PON equipment does not support the target line rate.

5. The method according to claim 1, wherein the rate tuning request message is implemented using a physical layer operations administration and maintenance (PLOAM) message.

6. The method according to claim 1, sending the rate tuning request message to the second PON equipment when the target line rate is different from a current line rate between the first PON equipment and the second PON equipment.

7. The method according to claim 1, further comprising determining, by the first PON equipment, a lower target line rate between the first PON equipment and the second PON equipment according to a smaller service traffic.

8. Passive optical network (PON) equipment, comprising:
a processor; and
a storing executable instructions that, when executed by the processor, cause the PON equipment to:
  obtain service traffic information between the PON equipment and a second PON equipment;
  determine a target line rate between the PON equipment and the second PON equipment according to the service traffic information;
  transmit data on a line between the PON equipment and the second PON equipment according to the target line rate, wherein the second PON equipment is an optical network unit (ONU) when the PON equipment is an optical line terminal (OLT), or wherein the second PON equipment is an OLT when the PON equipment is an ONU; and
  send a rate tuning request message to the second PON equipment, wherein the rate tuning request message comprises an ONU identifier (ONU-ID), a rate tuning start moment field, and a target line rate field, wherein the target line rate field carries the target line rate, and wherein the rate tuning start moment field is used to carry a condition for starting a rate tuning.

9. The PON equipment according to claim 8, wherein the service traffic information comprises a quantity and a size of service packets transmitted between the PON equipment and the second PON equipment within a specified duration.

10. The PON equipment according to claim 9, wherein the executable instructions, when executed by the processor, further cause the PON equipment to:
  calculate a service rate between the PON equipment and the second PON equipment according to the service traffic information; and
  use a lowest line rate that is greater than the service rate and that is in line rates supported by the PON equipment and the second PON equipment as the target line rate when the service rate is less than a current line rate between the PON equipment and the second PON equipment.

11. The equipment according to claim 8, wherein the executable instructions, when executed by the processor, further cause the PON equipment to:
  receive a rate tuning response ACK physical layer operations administration and maintenance (PLOAM) message from the second PON equipment when the second PON equipment supports the target line rate; and
  receive a rate tuning response NACK PLOAM message from the second PON equipment when the second PON equipment does not support the target line rate.

12. The equipment according to claim 8, wherein the executable instructions, when executed by the processor, further cause the PON equipment to determine a lower target line rate between the PON equipment and the second PON equipment according to a smaller service traffic.

13. An apparatus applied to first passive optical network (PON) equipment, wherein the apparatus comprises:
a processor; and
a memory storing executable instructions that, when executed by the processor, cause the apparatus to:
  obtain, by the first PON equipment, service traffic information between the first PON equipment and a second PON equipment;
  determine a target line rate between the first PON equipment and the second PON equipment according to the service traffic information;
  transmit data on a line between the first PON equipment and the second PON equipment according to the target line rate, wherein the second PON equipment is an optical network unit (ONU) when the first PON equipment is an optical line terminal (OLT), or wherein the second PON equipment is an OLT when the first PON equipment is an ONU; and
  sending, by the first PON equipment, a rate tuning request message to the second PON equipment, wherein the rate tuning request message comprises an ONU identifier (ONU-ID), a rate tuning start moment field, and a target line rate field, wherein the target line rate field carries the target line rate, and wherein the rate tuning start moment field is used to carry a condition for starting a rate tuning.

14. A passive optical network (PON) equipment, comprising:
a processor; and
a memory storing executable instructions that, when executed by the processor, cause the PON equipment to:
  obtain service traffic information between the PON equipment and a second PON equipment;
  determine a target line rate between the PON equipment and the second PON equipment according to the service traffic information;
  transmit data on a line between the PON equipment and the second PON equipment according to the target line rate, wherein the second PON equipment is an optical network unit (ONU) when the PON equipment is an optical line terminal (OLT), or wherein the second PON equipment is an OLT when the PON equipment is an ONU; and
  send a rate tuning request message to the second PON equipment, wherein the rate tuning request message comprises an ONU identifier (ONU-ID), a rate tuning start moment field, and a target line rate field, wherein the target line rate field carries the target line rate, and wherein the rate tuning start moment field is used to carry a condition for starting a rate tuning.

15. A passive optical network (PON), comprising:
a first PON equipment;
a second PON equipment; and
an optical distribution network, wherein the first PON equipment is coupled to the second PON equipment using the optical distribution network, wherein the second PON equipment is an optical network unit (ONU) when the first PON equipment is an optical line terminal (OLT), or wherein the second PON equipment is an OLT when the first PON equipment is an ONU, the first PON equipment comprising:
a processor; and
a storing executable instructions that, when executed by the processor, cause the first PON equipment to:
  obtain service traffic information between the first PON equipment and second PON equipment;
  determine a target line rate between the first PON equipment and the second PON equipment according to the service traffic information;

transmit data on a line between the first PON equipment and the second PON equipment according to the target line rate; and send a rate tuning request message to the second PON equipment, wherein the rate tuning request message comprises an ONU identifier (ONU-ID), a rate tuning start moment field, and a target line rate field, wherein the target line rate field carries the target line rate, and wherein the rate tuning start moment field is used to carry a condition for starting a rate tuning.

16. A data transmission method, applied to a point to point wavelength division multiplexing passive optical network, wherein the method comprises:

receiving, by a second passive optical network (PON) equipment, a rate tuning request message from a first PON equipment, wherein the rate tuning request message is implemented using a physical layer operations administration and maintenance (PLOAM) message, wherein the rate tuning request message comprises an optical network unit identifier (ONU-ID), a rate tuning start moment field, and a target line rate field, and wherein the target line rate field carries a target line rate; and tuning, by the second PON equipment, a line rate to the target line rate after determining that the second PON equipment supports the target line rate.

17. The method according to claim 16, further comprising:

sending, by the second PON equipment, a rate tuning response ACK physical layer operations administration and maintenance (PLOAM) message to the first PON equipment after determining that the second PON equipment supports the target line rate; and sending, by the second PON equipment, a rate tuning response NACK PLOAM message to the first PON equipment after determining that the second PON equipment does not support the target line rate.

18. Passive optical network (PON) equipment, comprising:

a processor; and a memory storing executable instructions that, when executed by the processor, cause the PON equipment to:

receive a rate tuning request message from a first PON equipment, wherein the rate tuning request message is implemented using a physical layer operations administration and maintenance (PLOAM) message, wherein the rate tuning request message comprises an optical network unit identifier (ONU-ID), a rate tuning start moment field, and a target line rate field, and wherein the target line rate field carries a target line rate; and tune a line rate to the target line rate after determining that that the PON equipment supports the target line rate.

19. The PON equipment according to claim 18, wherein the executable instructions, when executed by the processor, further cause the PON equipment to:

send a rate tuning response ACK PLOAM message to the first PON equipment after determining that the PON equipment supports the target line rate; and send a rate tuning response NACK PLOAM message to the first PON equipment after determining that the PON equipment does not support the target line rate.

* * * * *

UNITED STATES PATENT AND TRADEMARK OFFICE
CERTIFICATE OF CORRECTION

PATENT NO. : 10,491,323 B2  
APPLICATION NO. : 15/392111  
DATED : November 26, 2019  
INVENTOR(S) : Bo Gao Page 1 of 1

It is certified that error appears in the above-identified patent and that said Letters Patent is hereby corrected as shown below:

In the Claims

Claim 12, Column 31, Line 63: "The equipment according" should read "The PON equipment according"

Claim 15, Column 32, Line 61: "a storing executable" should read "a memory storing executable"

Signed and Sealed this  
Seventh Day of January, 2020

Andrei Iancu  
*Director of the United States Patent and Trademark Office*